United States Patent
Gupta et al.

(10) Patent No.: US 7,136,178 B1
(45) Date of Patent: Nov. 14, 2006

(54) SYSTEM AND RELATED METHODS FOR DYNAMICALLY COMPILING A PUBLICATION

(75) Inventors: Aloke Gupta, Corvallis, OR (US); Pieter J. van Zee, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 685 days.

(21) Appl. No.: 09/762,578

(22) PCT Filed: Jun. 1, 2000

(86) PCT No.: PCT/US00/15194

§ 371 (c)(1),
(2), (4) Date: Feb. 7, 2001

(87) PCT Pub. No.: WO00/75799

PCT Pub. Date: Dec. 14, 2000

Related U.S. Application Data

(63) Continuation-in-part of application No. 09/325,040, filed on Jun. 7, 1999, now Pat. No. 7,065,497.

(51) Int. Cl.
G06F 15/00 (2006.01)
G06F 15/173 (2006.01)
G06F 7/00 (2006.01)

(52) U.S. Cl. .................. 358/1.15; 358/1.13; 358/1.14; 358/1.18; 707/2; 709/240

(58) Field of Classification Search ............... 358/1.13, 358/1.15, 1.16, 1.17, 1.18, 1.14, 1.5, 1.12, 358/400; 707/2, 3, 10, 501, 513; 705/10; 709/240

See application file for complete search history.

(56) References Cited

U.S. PATENT DOCUMENTS

| | | | |
|---|---|---|---|
| 5,862,325 A | 1/1999 | Reed et al. | |
| 5,878,421 A * | 3/1999 | Ferrel et al. | 707/100 |
| 5,890,152 A | 3/1999 | Rapaport et al. | |
| 5,907,837 A | 5/1999 | Ferrel et al. | |
| 6,018,338 A | 1/2000 | Greulich et al. | 345/333 |
| 6,038,601 A | 3/2000 | Lambert et al. | 709/226 |
| 6,044,205 A | 3/2000 | Reed et al. | 395/200.31 |
| 6,047,327 A * | 4/2000 | Tso et al. | 709/232 |
| 6,230,173 B1* | 5/2001 | Ferrel et al. | 715/513 |
| 6,397,231 B1* | 5/2002 | Salisbury et al. | 715/515 |
| 6,591,245 B1* | 7/2003 | Klug | 705/10 |
| 6,658,464 B1* | 12/2003 | Reisman | 709/219 |
| 6,694,316 B1* | 2/2004 | Langseth et al. | 707/10 |
| 6,766,362 B1* | 7/2004 | Miyasaka et al. | 709/219 |
| 6,972,861 B1* | 12/2005 | van Zee et al. | 358/1.15 |

FOREIGN PATENT DOCUMENTS

| | | |
|---|---|---|
| EP | 0749081 A1 | 12/1996 |
| WO | WO99/04345 | 1/1999 |
| WO | WO99/63452 | 12/1999 |

* cited by examiner

*Primary Examiner*—Douglas Q. Tran
*Assistant Examiner*—Chan S. Park

(57) ABSTRACT

A system (10) for dynamically compiling a publication (6001) is presented including one or more publication agents (500) coupled to a plurality of content providers (50, 80) through a network. The publication agent(s) (500), responsive to receipt of a publication profile (641), selectively issue one or more requests for content from select content providers (50, 80) at a time(s) appropriate to the requested content. In this regard, the publication agents (500) function to improve the accuracy, timeliness and relevancy of the content comprising the generated publication (6001).

23 Claims, 23 Drawing Sheets

| Publication Name | Prod_ID | Pub_Location | Interest_info | Source_info | Associated_Adv | Sched |
|---|---|---|---|---|---|---|
| Your Regional Basketball Report | 223157 | Formatting Engine ID | Big 10 ACC ... | Chicago Tribune Atlantic Times ... | United Center NFL Panthers ... | Daily AM |
| Prescott Daily News | 23142 | eMail Addresses | Investments Regional_Int. ... | Inv_Daily Chicos Trib ... | YCA PizzaZone ... | Daily PM |

| Content_prvdr | Prvdr_ID | Wrapper_ID | Rate_schedule | Monthly_usage | Feedback_info |
|---|---|---|---|---|---|
| Sports Illustrated | 221 | 132<br>133<br>134 | .02<br>.04<br>.04 | 10000<br>1500000<br>1980000 | Feedback_Info |
| NY Times | 223 | 310<br>311<br>312 | .03<br>.05<br>.05 | 50000<br>2250000<br>2490000 | Feedback_info |

| Format_Eng_ID | P_Time | Destination_ID | Interest_info | Subscription_info | Req_Time |
|---|---|---|---|---|---|
| 123.24.22.4 | M-F 08:30 | 123.24.22.4 | NY Politics Stock Quotes ... | NY Times NASDC ... | 08:15 |
| 12342321.2 | 17:00 | (555) 123-4231 | Stock Quotes Sports ... | WSJ SI ... | 16:45 |

702 / 704 / 706 / 708 / 710 / 712

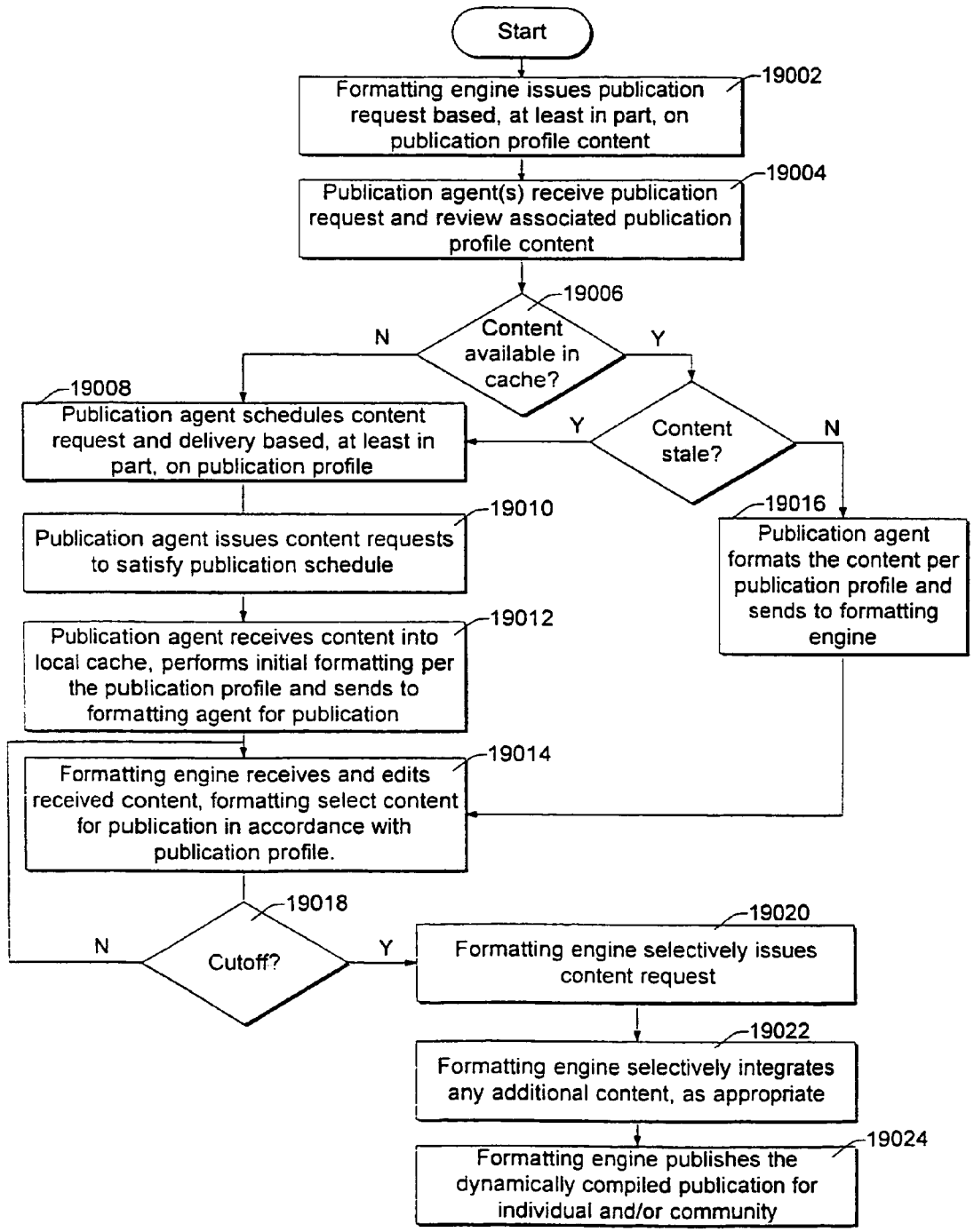

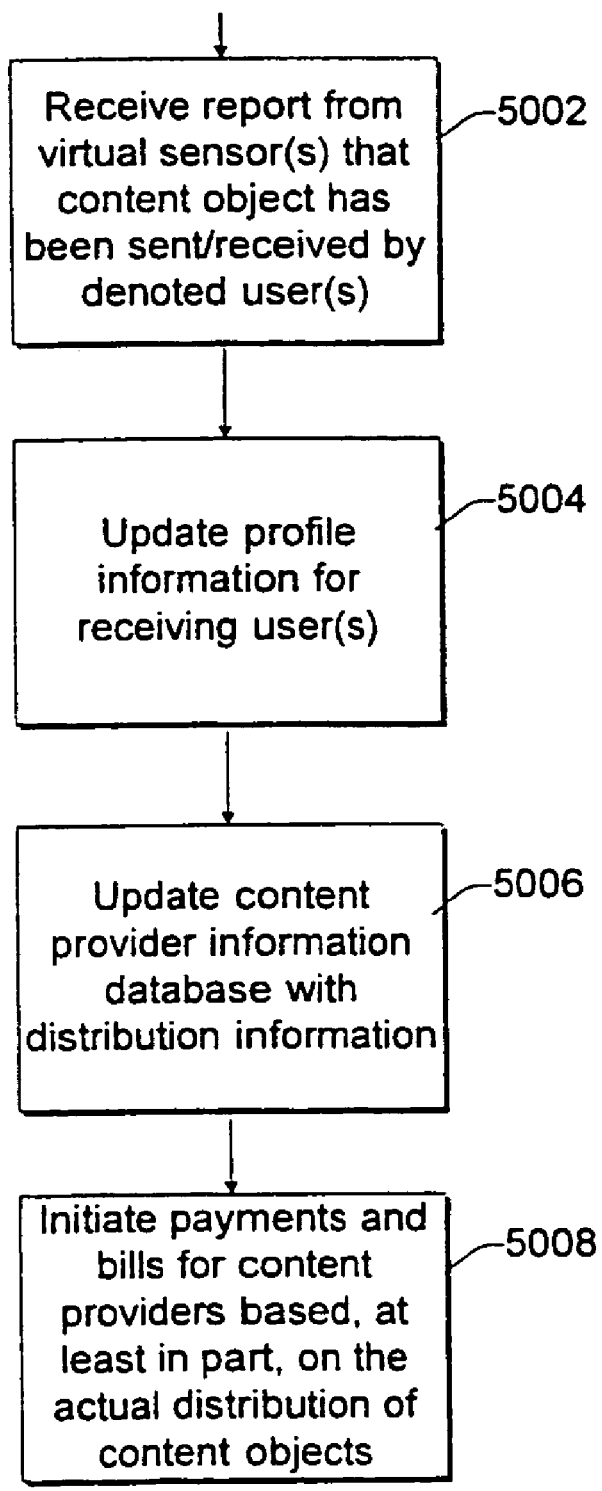

| Personal Publishing Tools | | | |
|---|---|---|---|
| Producer's Name | John Doe | Password: | ●●●●●● |
| Publication Title | "Your Regional College Basketball Report" | Delivery: | Daily/Morning ▼ |
| Topic/Genre: | Sports/College Basketball ▼ | Scope: | Regional/Big 10 ▼ |
| Content Provider(s): | Chicago Tribune ▼ | ←(choose as many as apply) | |
| Layout Template: | Multi-column; Color Photos* ▼ | * Publication fees may apply | |
| Advertising Provider(s): | NONE* ▼ | * Publication fees may apply | |
| Pre-approve Publication: | Y ▼ | | |
| eMail Address: | jdoe@basketballnut.com | | |

Limitation on Liability: Producer hereby agrees abide by the terms and conditions for use set forth in the user agreement attached hereto; to waive any and all claims against Personal Publishing Tools, Corp.; and to fully indemnify Personal Publishing Tools, Corp. for all suits arising out of publication of "Your Regional College Basketball Report".

AGREE: ☑    DISAGREE (cancel): ☐

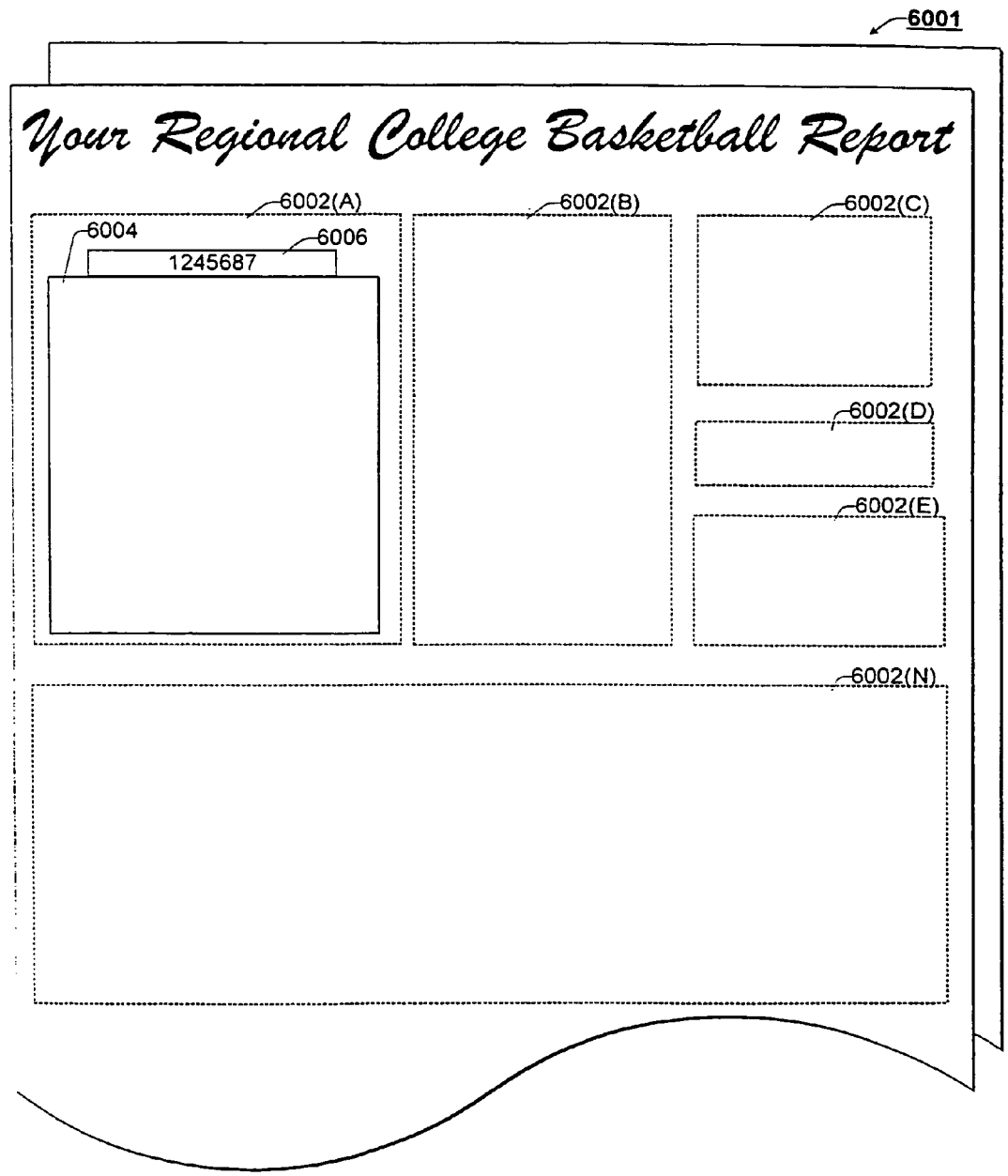

SYSTEM AND RELATED METHODS FOR DYNAMICALLY COMPILING A PUBLICATION

RELATED INVENTIONS

The present invention is a continuation-in-part of U.S. application No. 09/325,040 filed on Jun. 7, 1999 now U.S. Pat. No. 7,065,497, entitled Document Delivery System for Automatically Printing a Document on a Printing Device, by Brewster, et al.

TECHNICAL FIELD

This invention generally relates to the printing field and, more particularly, to a system and related methods for dynamically compiling content for a publication.

BACKGROUND

In the mid-1400's, Johann Gutenberg revolutionized how information is disseminated through his invention of the movable type press. With the publication of the Mazarin Bible, documents which were once held in the exclusive domain of a chosen few were now widely available to the masses. Nearly 550 years later, the mass media revolution that Gutenberg started is alive and well, complete with newspapers such as the New York Times and the Washington Post, magazines such as Newsweek and Sports Illustrated, and literally thousands upon thousands of other publications.

While these thousands of publications cover a wide range of interests, from news to sports to fashion to model rocketry, they have one thing in common; they are intended to be read by a mass market. Unlike the pre-Gutenberg days, where a document would literally be read by only one person of a very small number of people, it is not economically viable for today's publications to have such a small readership, due at least in part to high marketing, production and distribution costs. In fact, many of today's publications are funded to a very large extent by the advertising contained within them. These advertisers are attracted to publications that can consistently deliver a large, reliable audience of consumers that will be exposed to their advertising.

While this mass-market publication model has worked well for hundreds of years, it is not without its problems. One such problem is that a typical reader of a publication has a wide variety of interests, and no single mass market publication will be able to satisfy all of these interests. For example, a reader who is interested in international news, golf, fly-fishing, Genealogy, and computers may have to subscribe to several different publications to satisfy these interests. Of course, since these publications are intended for the mass market, they will also contain a significant amount of material that our reader is not interested in and will not read. It goes without saying that if there is a significant amount of material a reader isn't reading, there is a significant amount of advertising that the reader isn't reading either—as well as a significant amount of paper that is wasted. Advertisers know this, and agree to pay considerably less to a mass market magazine or newspaper per 1000 exposures to their ad than they would pay to a direct-mail generator that can provide a more specific guarantee that the people exposed to their ad are of a demographic group that will be much more likely to read their ad and be interested in it.

In addition, it is neither cost-effective nor time effective for most readers to subscribe to and/or read a large number of publications. Generally, the typical reader will only subscribe to a few publications that are of the most interest to them. The reduced readership level of the publications our typical reader chooses not to subscribe to, even though she might be interested in at least some of the editorial and advertising content contained inside, means that the publication receives less subscription and advertising revenue than they otherwise would. If many other readers make the same decision, the continued health of the publication may be in jeopardy, and the publication may be forced out of business. In fact, many publications do go out of business yearly for failing to attract a sustaining number of advertisers and readers—even if there are a large number of readers that would be interested in reading their publication, and a corresponding number of advertisers anxious to have these readers exposed to their ads. In general, publications that fail to attract a substantial mass market of people willing to pay for and/or read them cease publication. This is a shame, since many of these publications would enrich the diversity of information available to all readers, and would provide an avenue for lesser known writers and artists to practice their wares.

In more recent years, a new type of publication has emerged; the electronic publication. Readers of these publications typically sign into the Internet through their computer, and read the publications online. Some of these publications, such as CNN.com and pointcast.com, allow users to state personal preference on what type of material they would like to read. Often, these publications include advertising, usually in the form of a "banner ad" that is placed on along a periphery of the visual display (top, bottom, side, etc.).

While these electronic publications have been an interesting development in the distribution of information, they still represent only a tiny fraction of the information that is published under the more traditional post-Gutenberg model. Many readers of these electronic publications complain that they are very difficult to read (on the video display), especially for long periods of time. While it might be convenient for a reader to sign onto the Internet to look at the CNN.com web site for a brief summary of late breaking news, this reader would most likely only spend a few minutes at the site, and would likely still subscribe to the more traditional print media such as Newsweek or the Washington Post. They would also likely spend significantly more time reading the more traditional printed publication than they would spend reading the electronic publication, and correspondingly, spend more time being exposed to the ads in the traditional printed publication. Accordingly, printed publications continue to flourish today—more than five centuries after Gutenberg made them possible—and more than a decade after the innovation of the electronic publication.

Thus, while these publications have certainly benefited modern society, no significant attempt has been made thus far to solve the underlying problems with these publications discussed above. Just such a solution is provided herein.

SUMMARY

In accordance with the teachings of the present invention, various aspects of an innovative document delivery system is presented incorporating the teachings of the present invention. According to one implementation of the invention, a system for dynamically compiling a publication is presented comprising one or more publication agents coupled to a plurality of content providers through a network. The publication agent(s), responsive to receipt of a publication profile, selectively issue one or more requests for content from select content providers at a time(s) appropriate to the requested content. In this regard, the publication agents function to improve the accuracy, timeliness and relevancy of the content comprising the generated publication.

According to one aspect of the invention, a publication profile is introduced. The publication profile is designed to reflect the publication interests of an individual or a community of individuals. Accordingly, the publication profile may include one or more of content preferences, formatting preferences, advertising preferences, color preferences, delivery or publication preferences, and the like. According to one implementation, the publication profile is generated and continually revised/refined to reflect the interests of the associated individual and/or community by a formatting engine, often located at a computing system associated with the recipient(s).

According to one aspect of the invention, a formatting engine is introduced. Formatting engine periodically issues the publication profile to the publication agents to retrieve content and dynamically compile a publication in accordance with a publication schedule denoted in the publication profile. The formatting engine receives content from content providers and integrates the received content in a dynamically compiled publication (i.e., for the requesting individual(s)/community). The formatting engine formats the dynamically compiled publication based on the received content and in accordance with publication preferences denoted in the publication profile. According to one implementation, the formatting engine is incorporated within one or more publication agent(s), some of which residing at the point of publication (e.g., a computing system associated with the receiving individual/community).

BRIEF DESCRIPTION OF THE DRAWINGS

FIG. 5 illustrates how user profile information is acquired from a user in one embodiment of the invention;

FIG. 6 shows how user profile information is acquired from a user in one embodiment of the invention;

FIG. 10 shows a document printed by the printing device according to one embodiment of the invention;

FIGS. 16 and 17 graphically illustrate data structures comprising a publication profile and transaction information, respectively;

FIG. 18 graphically represents a data structure comprising a publication schedule maintained at, for example, a publication agent in accordance with one implementation of the present invention;

FIG. 19 illustrates a flow chart of an example method for dynamically compiling a publication in accordance with the teachings of the present invention;

FIG. 21 illustrates a flow chart of an example method for tracking the distribution of content objects and accounting to content providers, in accordance with one aspect of the present invention;

FIG. 22 graphically represents an example graphical user interface (UI) enabling a producer to register and generate a publication profile, in accordance with one aspect of the present invention; and FIG. 23 graphically illustrates an example publication dynamically compiled throughout the publication process, in accordance with the teachings of the present invention.

DETAILED DESCRIPTION

Figure 1:
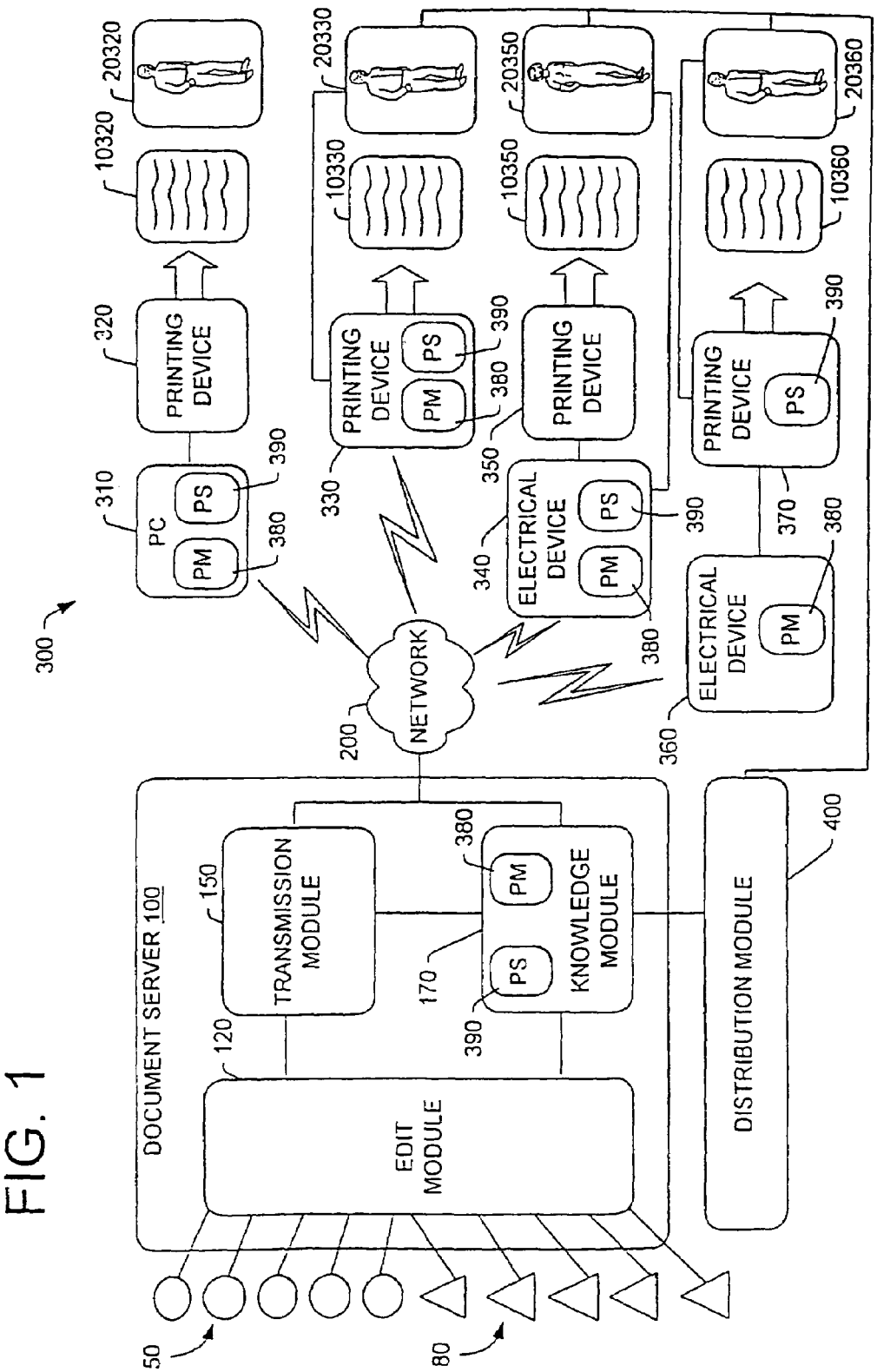
FIG. 1 shows a block diagram of a document delivery system of one embodiment of the invention.

FIG. 1 illustrates a block diagram of an innovative document delivery system, according to one embodiment of the invention. According to one implementation of the present invention, document delivery system 10 contains document server 100. In a preferred embodiment, document server 100 is operatively coupled via network 200 to a variety of personal computers, printing devices, and other electronic devices, collectively referred to as devices 300. In accordance with this first embodiment, document delivery server 100 selectively receives/retrieves content to dynamically generate personalized publications from otherwise disparate content objects in accordance with a publication profile. In alternate embodiments, to be described more fully below, the content retrieval and publication process is distributed throughout document delivery system 10.

In accordance with this distributed embodiment, document delivery system 10 also includes one or more publication agent(s) 500 distributed throughout system 10 and responsive to formatting engine(s) 600. As will be described in greater detail below, formatting engine(s) 600 issue a publication profile to publication agents 500 distributed throughout system 10 to selectively retrieve content for use in a publication, dynamically compiled and formatted by formatting engine 600. As will be developed in greater detail below, the distributed embodiment of document delivery system 100 facilitates an on-demand publishing service which provides added flexibility over prior art publishing models to provide the latest available information on an individual or community-basis.

As used herein, content providers 50 are intended to include all providers of publication content non-inclusive of advertising, while advertising providers 80 provide advertising material. From a financial business model, these two sources of publication material differ significantly (i.e., content providers 50 are paid a royalty from the operator of the document server, while advertisers 80 pay to advertise in the generated publications). From the standpoint of the end-user (publication recipient), however, they both provide content to the publication. Consequently, when used without a reference numeral the general term "content providers" is intended to include both content providers 50 and advertising providers 80. If a distinction is intended, the appropriate reference numeral will be specifically denoted to further specify the source of content.

In accordance with the first example embodiment, edit module 12 receives content object input from one or more content providers 50, and/or one or more advertising providers 80 to generate personalized documents based, at least in part, on a number of key criteria including, for example, user interests, seasonality, content provider and advertising provider distribution criteria, publication time, and the like. According to one implementation, the key criteria is provided to system elements (e.g., edit module 120, publication agent 500 and/or formatting engine 600) in a publication profile, to be discussed more fully below.

Distribution module 400 is operatively coupled to document server 100 and, as will be discussed, optionally distributes product and/or product subsidies to users based, at least in part, on the source and quantity of content provided to the users. According to one implementation, edit module 120 maintains a transaction log documenting the distribution of content objects (identified using object wrappers having a unique identifier) from edit module. In accordance with another implementation, distribution module 400 receives distribution information from one or more of publication agent(s) 500 or formatting engine(s) 600.

In a preferred embodiment, document server 100 is a minicomputer/server, such as an HP 9000 server sold by the Hewlett-Packard Company, although those skilled in the art will appreciate that document server 100 could be any type of other computing or electronic device(s) that performs the functions described herein and still fall within the spirit and scope of the invention. Network 200 is preferably the Internet, although an Intranet, local area network, or other type of public or private network, either wired (e.g., telephone, cable TV, etc.) or wireless (e.g., satellite, radio, cell phone, etc.), could also or additionally be used.

Devices 300 are shown in FIG. 1 as being capable of being configured in a wide variety of ways. For example, personal computer 310 is shown connected to printing device 320, which prints document 10320 for user 20320. Personal computer 310 is operatively coupled to network 200. In contrast, printing device 330, which prints document 10330 for user 20330, is operatively coupled to network 200 without an intervening personal computer or other electronic device. Printing device 350, which prints document 10350 for user 20350, is shown connected to electronic device 340, which could be a set top box, television set, palmtop personal digital assistant (PDA) or other type of electronic device that is operatively coupled to network 200. Finally, printing device 370, which prints document 10370 for user 20370, is connected to electronic device 360, which is operatively connected to network 200. The printing devices shown in FIG. 1 could be printers, such as the HP DeskJet 890 printer, HP LaserJet V printer, or other models of printers manufactured by HP or others; so-called "mopiers" or other multi-function printing devices that can print, fax, scan, and/or copy, or any other device capable of transferring information to a printable media such as plain paper, specialty paper, transparencies, or other media capable of tangibly receiving such information and which can be easily carried about by the user.

Transmission module 150 is preferably located with document server 100. As FIG. 1 shows, printing module 380 could be located in any of the devices 300, such as in personal computer 310, printing device 330, or electronic device 340, operatively coupled via network 200 to document server 100, or it could be located within document server 100 itself, such as in knowledge module 170. According to one embodiment of the invention, transmission module 150 and printing module 380 represent software functions that execute on suitably programmed microprocessor(s) within a device 300 and/or document server 100. It will be appreciated, however, that special purpose hardware or other mechanisms could be employed to implement the innovative features and functions described below.

Figure 15:
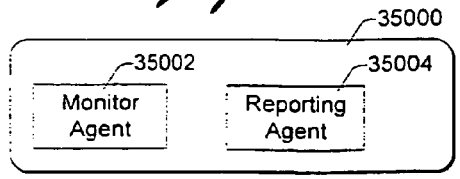
FIG. 15 is a block diagram of an example virtual sensor, according to one embodiment of the present invention.

Turning briefly to FIG. 15, a block diagram of an example virtual sensor to monitor and report on content object distribution is presented, according to one implementation of the present invention. As introduced above, one or more virtual sensors 35000 are selectively distributed throughout document delivery system 10 to monitor and report on the distribution, receipt and user disposition of content objects. According to one implementation, virtual sensor(s) 35000 are incorporated into printing module 380 throughout document delivery system 10. In accordance with the illustrated example embodiment of FIG. 15, virtual sensor 35000 is shown comprising a monitoring agent 35002 and a reporting agent 35004, communicatively coupled as depicted.

As used herein, monitoring agent 35002 receives network traffic and analyzes the traffic for distribution of content objects which are traceable back to a particular edit module (e.g., 120) and/or document delivery server (e.g., 100). According to one example implementation, monitoring agent 35002 analyzes the received network traffic for content objects wrapped in trace wrappers (to be described more fully below). The trace wrapper information uniquely identifies the content object and, optionally, the edit module or document delivery server responsible for the distribution of the content object. Reporting agent 35004 is invoked to compile and issue a report to one or more document delivery server(s) 100 identifying document distribution, receipt and user disposition of received content objects. Although illustrated in accordance with a hardware paradigm, the virtual sensor 35000 and/or one or more of its constituent elements may well be implemented by a series of executable instructions that carry out the functions to be described more fully below.

Similarly, a content provider information database may used by document delivery system to maintain a history of content object distribution, receipt and disposition. According to one implementation, the database is located within edit module 120. In accordance with another embodiment, distribution database is remotely located and accessible by edit module 120, publication agent 500 and/or formatting engine 600. According to one aspect of the invention, edit module 120 includes a contract administrator, which utilizes information maintained in content provider information database to periodically calculate royalty payments, advertising bills, and subscription bills.

Figure 2:
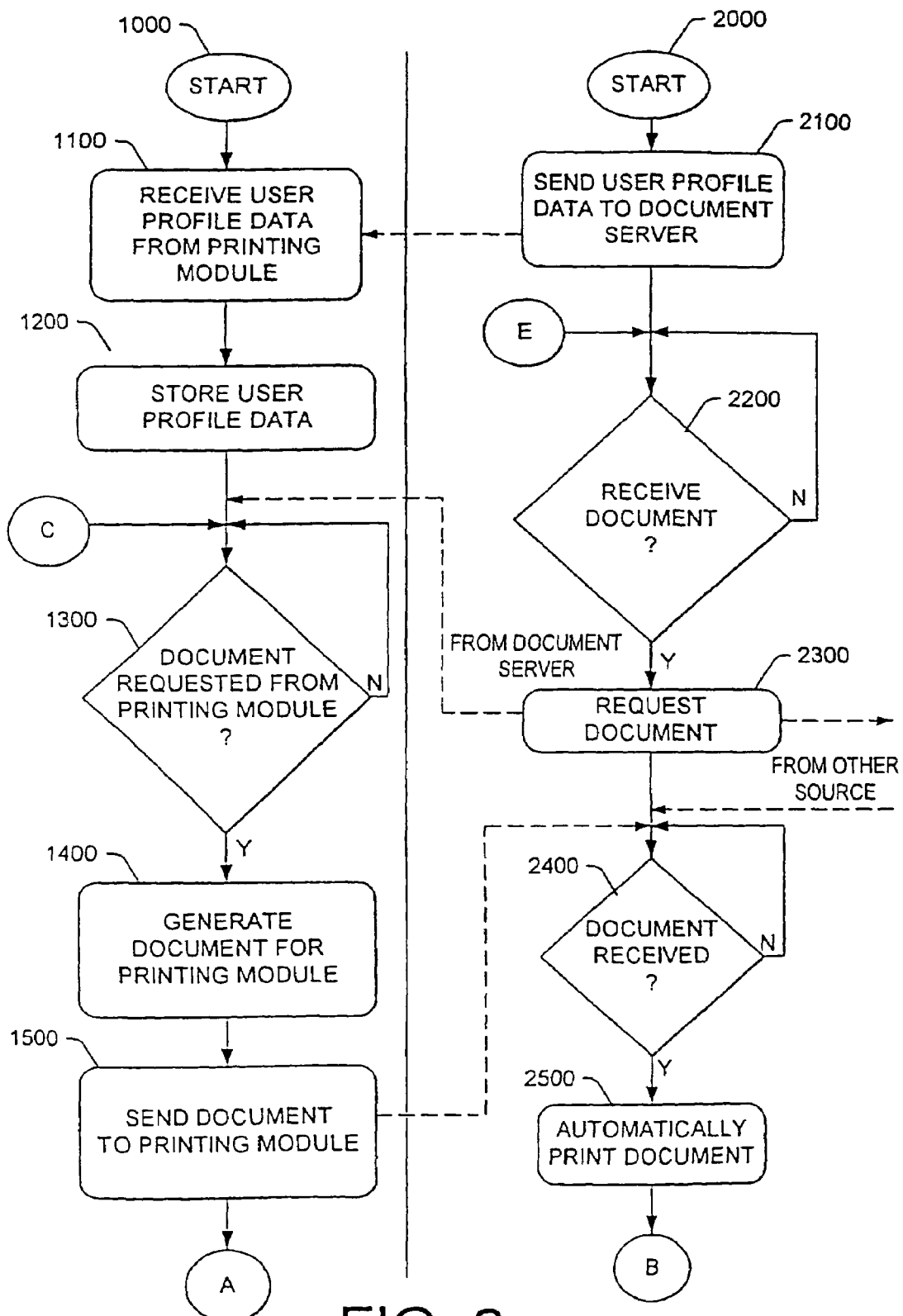
FIGS. 2–4 illustrate flowcharts detailing the operation of the transmission module and the printing module of the document delivery system of one embodiment of the invention.
Figure 3:
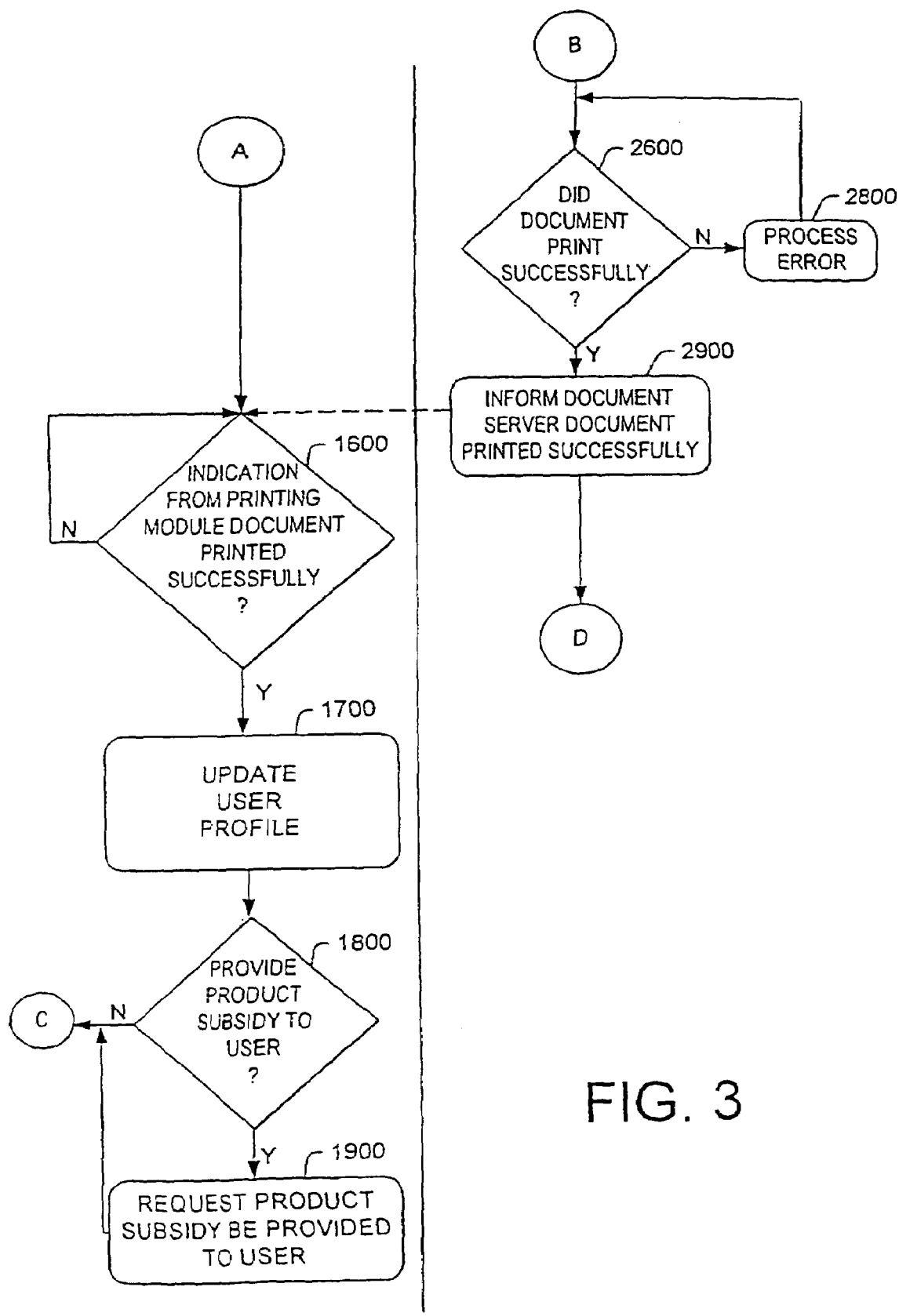
Figure 4:
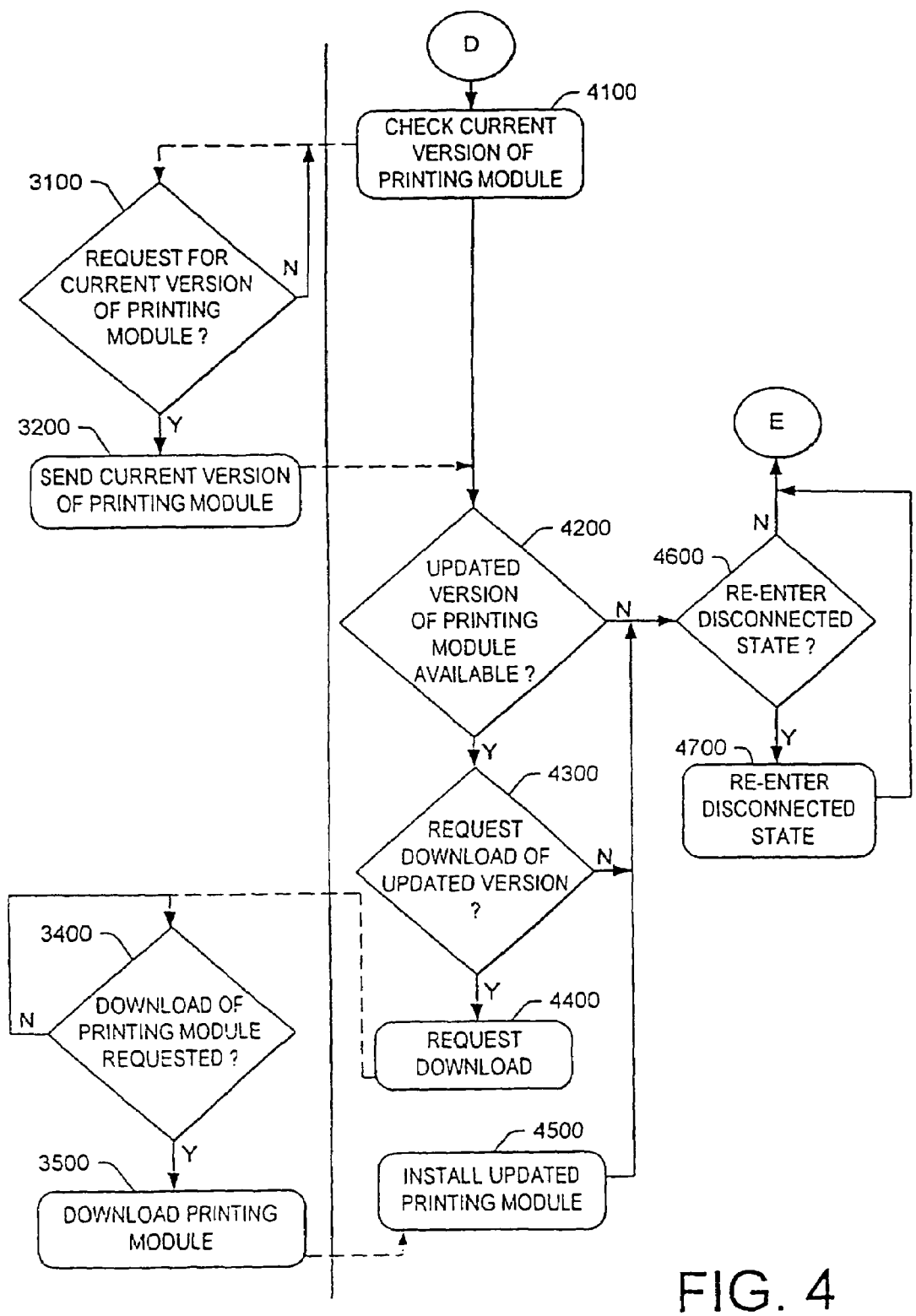

Having introduced document delivery system 10, an example method of operation will be presented with reference to FIGS. 2–12, in accordance with a first embodiment of the present invention. Turning to FIGS. 2–4, flowcharts detailing the operation of transmission module 150 and a first mode of operation of printing module 380 are presented, according to one embodiment of the invention. In FIGS. 2–4, the flow diagram shown in the left column is executed by transmission module 150 of document server 100, and the flow diagram in the right column is executed by printing module 380.

Referring now to FIG. 2, the flow diagram for transmission module 150 starts in block 1000, and the flow diagram for printing module 380 starts in block 2000. Since there is a great deal of interaction between these two flow diagrams, as represented by dashed lines connecting the two columns, the operation of the two flow diagrams will be described simultaneously.

Figure 5:
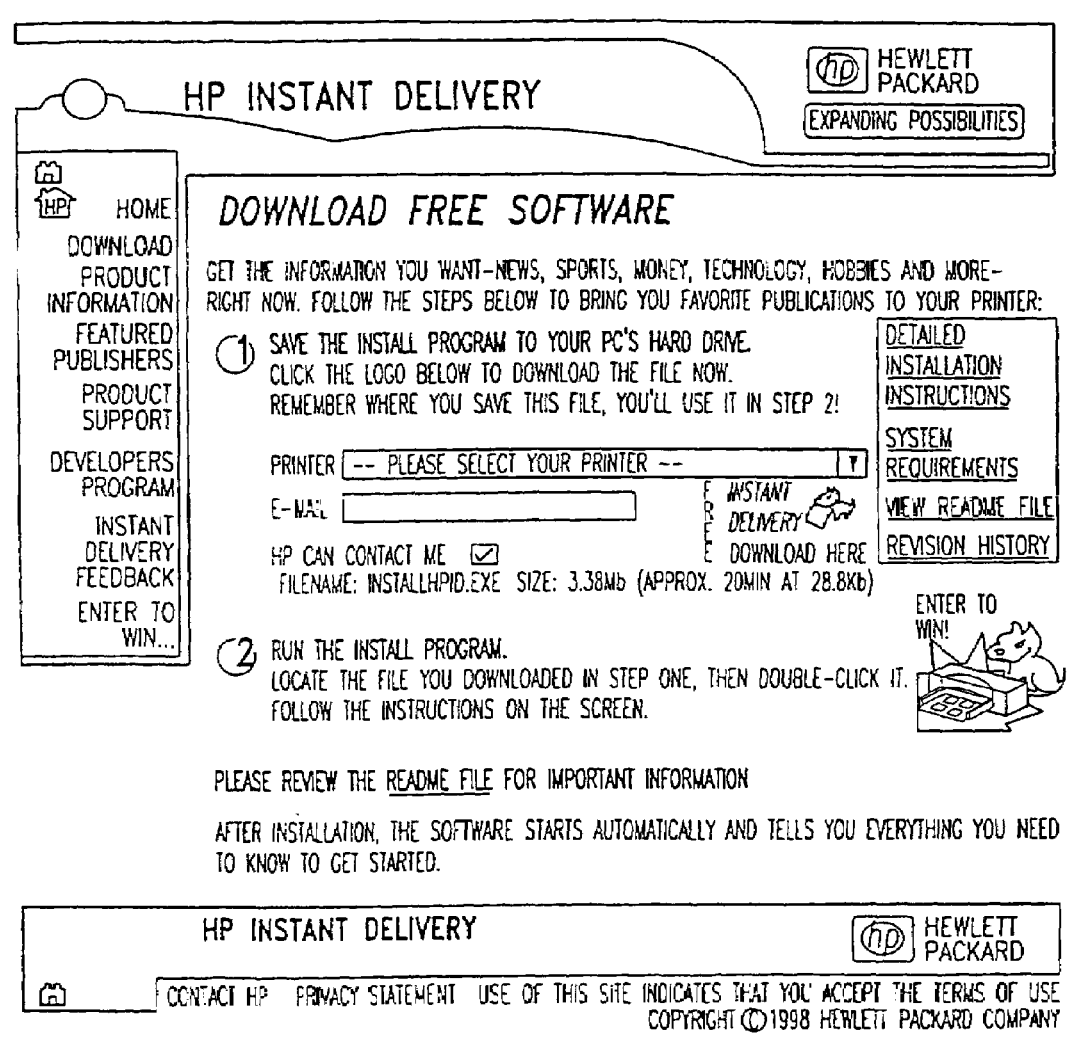
Figure 6:
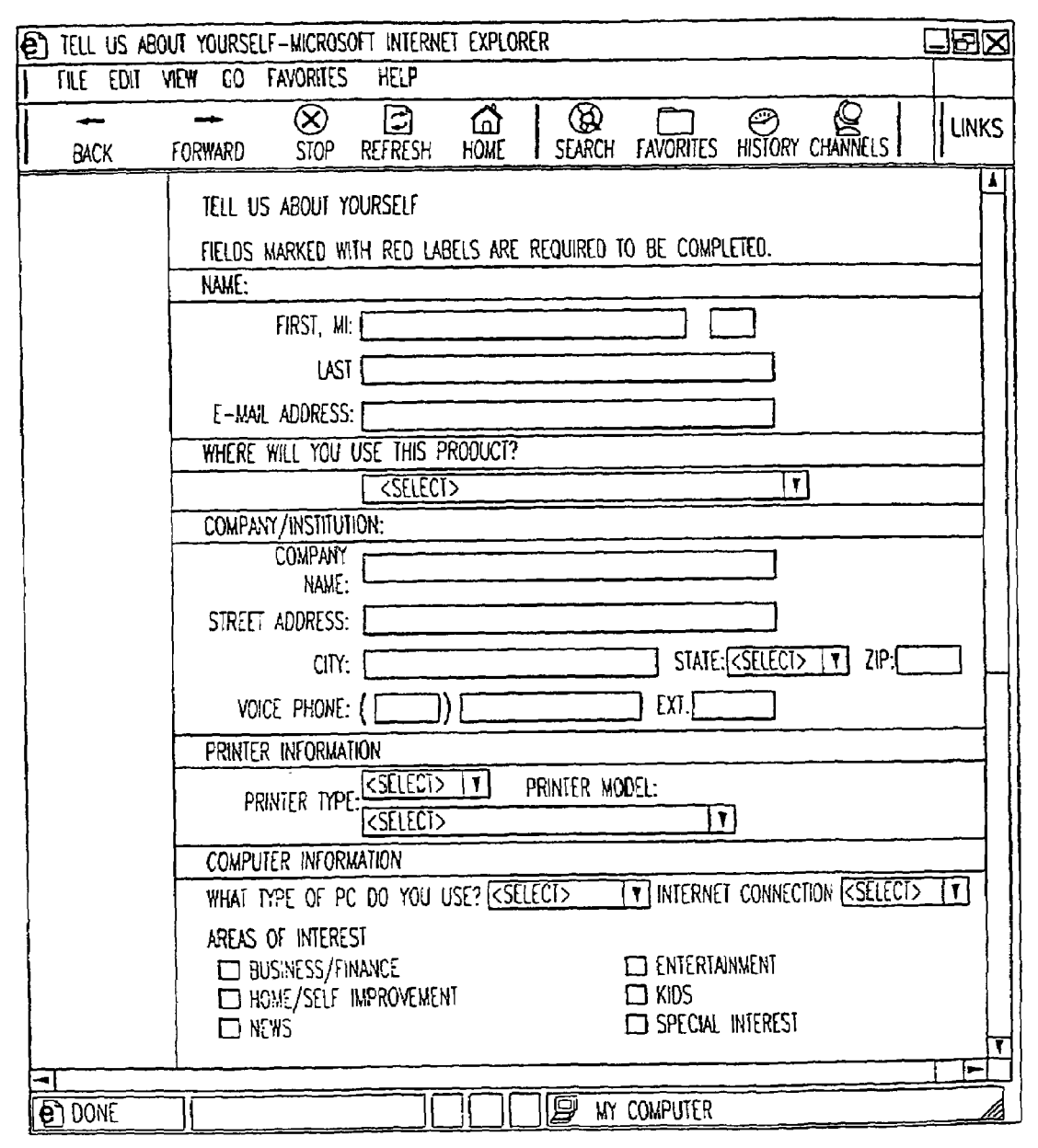

In block 2100, user profile data is sent to document server 100 to be stored in the user profile. The user profile data can take on many different forms, from simple to very detailed. FIG. 5 shows a very simple acquisition of user profile data, such as that used in HP's Instant Delivery Program, the first version of which was generally available to the public less than one year from the filing date of this patent application. In this program, only three pieces of information are stored in the user profile: type of printer, email address, and whether HP can contact the user. FIG. 6 shows a more complicated user profile than that currently used in HP's Instant Delivery Program, which includes the user's name, email address, company name, city, state, country, zip or postal code, phone number, printer information, and areas of interest. Those skilled in the art will appreciate that more or less user profile data from those shown in FIGS. 5 and 6 could be sent to transmission module 150 in block 2100 and still fall within the spirit and scope of the invention, and that at least some of this information could come from a source other than a user. For example, the user profile data could also include household income, age, and sex of the user, among other things. In any event, block 1100 receives the user profile data sent by block 2100. Block 1200 stores the user profile data, preferably in knowledge module 170. Alternately, the user profile data could be stored in device 300 or in some other local or remote location.

Block 2200 checks to see whether a document should be received from document server 100. This is done by checking print schedule 390 which is preferably stored on a device 300 or document server 100, but may be stored in some other local or remote location. Printing schedule 930 preferably contains information that can be used to determine when documents should be printed by the printing device, such as upon document creation, user requested time, lapse of specified time period, and/or occurrence of one or more external events (e.g., a stock price or index reaching a specified value, a final score of a sporting event, etc.). Printing schedule 390 may be associated with an individual user, a device or a group or users and/or devices. In addition, each entry of printing schedule 390 could result in the printing of one or more documents.

Figure 7:
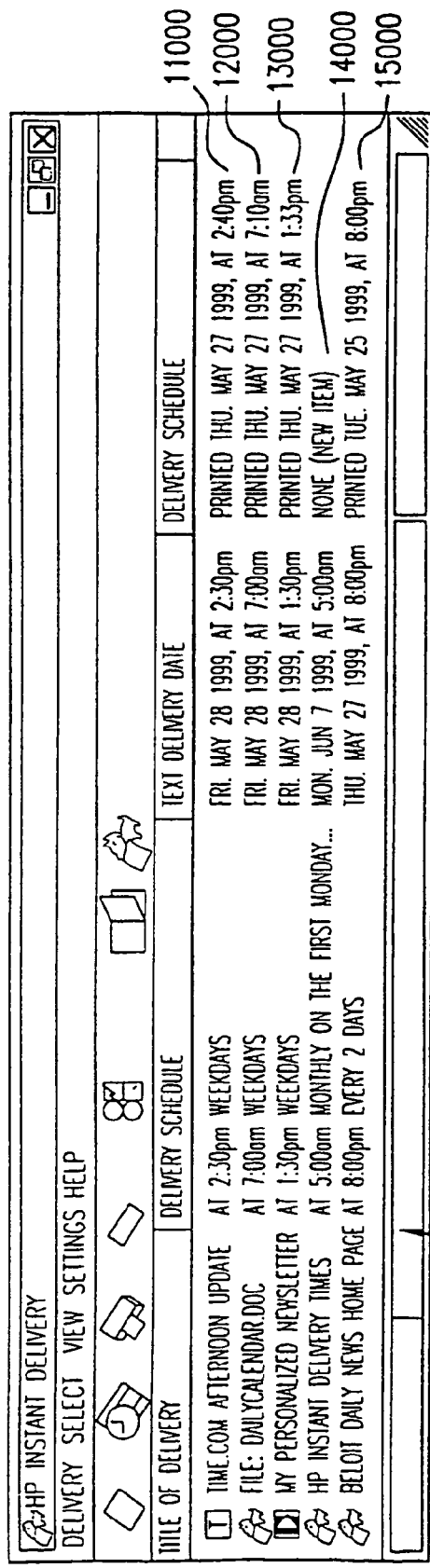
FIG. 7 shows a print schedule for the delivery of documents in one embodiment of the invention.

FIG. 7 shows one example of printing schedule 390, of the type that might be used in an enhanced version of HP's Instant Delivery program. In this example, the title of delivery, delivery schedule, next delivery data and time, and the last deliver status are shown. Preferably, the user can select what time a document should be printed, whether it should be printed on a specific day of the week or month, weekdays, or weekends, and whether the printing schedule should expire after a specific period of time or continue indefinitely.

Referring again to FIG. 2, printing module 380 monitors printing schedule 930 to see if a document should be requested from document server 100 or from another source. When block 2200 determines that a document should be requested from document server 100 or from another source, block 2200 is answered affirmatively, and block 2300 automatically requests the document without user intervention from server 100 or from another source, as will be described in greater detail below. Note that if printing module 380 is located on device 300, block 2200 operates in a "pull" mode—where the document is "pulled" from document server 100 or another source to device 300. However, if printing module 380 is located remotely from device 300, such as in document server 100, block 2200 operates in a "push" mode—where the document is "pushed" from document server 100 or another source to device 300. If block 2300 determines that the document is located on document server 100 or at another source accessible via network 200, and if device 300 is currently in a disconnected state where it is not operatively coupled to the network 200, block 2300 will sign on to or otherwise enter a connected state with network 200, so that device 300 is operatively coupled to network 200.

Meanwhile, block 1300 checks to see if a document has been requested from printing module 380 in block 2300. Once it determines that such a document has been requested, block 1400 generates the document for printing module 380. Block 1500 then sends the document to printing module 380. Block 2400 checks to see whether a document has been received from document server 100 via block 1500. Once such a document has been received, block 2500 automatically prints the document, without user intervention, on a printing device. The term "without user intervention" means that a user is not directly involved in the printing operation; the document is sent automatically to a device 300 to be printed out by a printing device. According to this mode of operation, the user does not press "any" print buttons or otherwise be directly involved in the printing process; in fact, the user may not even be present in the same room, city, state, or country as device 300 during the printing operation. The printing operation automatically occurs in an unattended state—regardless of whether the user is present or not. In addition, if print schedule 390 is stored in a device-independent manner, such as on document server 100, a travelling user could "log in" to document server 100 and have his or her customized document sent to a device 300 that is convenient to the user's current location.

Referring now to FIG. 3, block 2600 checks to see whether the document printed successfully. If not, block 2800 performs error handling, such as attempting to print the document again, notifying the user that the printing device is out of paper or has some other error condition, or simply deciding not to print the document. When the document prints successfully, block 2900 informs document server 100 that the document printed successfully. Block 1600 waits for an indication from printing module 380 that the document did print successfully. When such an indication is received, block 1700 updates the user profile with this information.

It will be appreciated that not all of the blocks in FIGS. 2–4 need be implemented, or implemented according to the order denoted, to fall within the spirit and scope of the present invention. More specifically, according to one implementation, flow of control moves from block 2600 to block 4100 of FIG. 4, as will be discussed later, and from block 1500 back to block 1300 of FIG. 2. An alternate embodiment has been contemplated where other information is transmitted back to document server 100 in block 2900 to update the user profile preferably stored in knowledge module 170. This other information could be ink usage (total usage or usage broken out by ink color), printable media usage (number of pages printed, type of media used, etc.), or other types of information. In addition, another alternate embodiment has been contemplated where some or all of the information contained in the user profile stored in knowledge module 170 came from a source other than the user via printing module 380. For example, publicly or privately available information about the user, and/or the devices 300 he/she/they use, could be acquired from a wide variety of different sources and inserted into the user profile preferably stored in knowledge module 170.

Block 1800 examines the user profile preferably stored in knowledge module 170 to determine whether a product subsidy should be provide to the user. For example, if the information in the user profile indicates that this user has printed off his $1000^{th}$ document, such as a "preferred" document that contains advertising from advertising providers 80 or is otherwise under the control of edit module 120, providing a product subsidy to the user may be warranted. For purposes of this invention, a "product subsidy" could be a print consumable or other product. A "print consumable" is an inkjet cartridge for an inkjet printer, ink for such an inkjet cartridge, a toner cartridge for a laser printer, toner for such a toner cartridge, or any other product or substance that is depleted when a document gets printed, including printer ribbons, etc. Note that the "ink" referred to above would typically be of a permanent variety, but erasable electronic ink, such as that sold by the Eink Company, could also be used.

Note that the product subsidy referred to herein is preferably funded at least in part by advertising revenue received from advertising providers 80 (FIG. 1), but an embodiment has been contemplated where the product subsidy is funded at least in part from the distribution revenue received from content providers 50 (FIG. 1). In either case, information (such as statistical information) about what was printed by whom is preferably provided to content providers 50 and/or advertising providers 80—preferably as a document that is automatically sent to one or more printing devices according to the teachings of this invention.

Other forms of products that are contemplated to be subsidized by this invention include printable media, such as plain paper, specialty paper, transparencies, and the like, and may also include devices 300 such as printing devices, electronic devices, and personal computers. In fact, alternate embodiments have been contemplated where other products, such as a subscription price to a document, or even a product not directly related to the document delivery system shown herein, such as soap or dog food, are subsidized. If block 1800 determines that such as subsidy is warranted, block 1900 requests that distribution module 400 provides such a subsidy to the user. In one embodiment, distribution module 400 simply mails a product such as a print consumable or other product such as the type described above to a user at the address specified in the user profile. In another embodiment, distribution module 400 mails or electronically generates a coupon that the user can use to receive a free or discounted product of the type described above. Regardless of whether block 1800 is answered affirmatively or negatively, flow of control then returns back to block 1300 (FIG. 2) to see if another document has been requested from the printing module 380.

Referring again to FIG. 3, after block 2900 informs document server 100 that the document printed successfully, flow of control moves to block 4100 (FIG. 4), which checks with document server 100 to see what the current version of printing module 380 is. Block 3100 checks to see whether such a request has been received, and when it is, block 3200 sends information concerning the current version of the printing module to printing module 380. Block 4200 compares this information from document server 100 with its own version and determines whether an updated version of printing module is available. For example, if printing module 380 is running version 4.0, and document server 100 indicates that version 4.1 is the current version of printing module 380, block 4200 would determine that an updated version of printing module 380 is available, and flow control would move to block 4300. Block 4300 checks to see whether this updated version of printing module 380 should be requested to be downloaded. While a user would typically be asked whether such a download should be requested or not, and would typically perform this download at a convenient time, such a step could also be performed automatically without user intervention. If such a download is requested, block 4400 is answered affirmatively, and block 3500 downloads the updated printing module, which is then installed in block 4500. Regardless of how blocks 4200 and 4300 are answered, flow of control moves to block 4600, which checks to see if a disconnected state should be entered. If block 2300 (FIG. 2) determined that device 300 was in a disconnected state when the document was requested, as discussed above (i.e., not operatively coupled to network 200), block 4600 is answered affirmatively, and block 4700 reenters the disconnected state. In any event, flow of control returns to block 2200 of FIG. 2.

Referring again to print schedule 390 shown in FIG. 7, it can be seen that many different types of documents can be requested to be printed. For example, the title of document 11000 specifies a network address, such as an Internet uniform resource locator (URL) that contains the network location of a document to be printed. Note that this URL may be partially or completely hidden from the user, as is the case with the URL for document 15000. In this scenario, edit module 120 of document server 100 merely goes out to the Internet at the URL indicated (which would be shown in FIG. 1 as one of the content providers 50), and captures the indicated document, which is then transmitted to a printing device via transmission module 150 and printing module 380, as has been discussed. Alternatively, device 300 could go directly out to the URL itself without assistance from document server 100; in this case, block 2300 (FIG. 2) requests document 11000 from another source—directly from the content provider 50 (at the indicated URL) via network 200.

In contrast, document 12000 is not a document that originates with a content provider 50 via the Internet, but instead is stored directly on device 300, such as a printing device, personal computer, or other electronic device. An example of such a document could be a daily calendar from a program such as Microsoft Outlook, which the user has requested be printed automatically to his printer, without any user intervention, at 7:00 a.m. every weekday morning. In such an embodiment, printing module 380 does not need to request the document from document server 100, since it can access the documents without going through network 200. In this embodiment, block 2300 of FIG. 2 requests the document from another source—device 300. While block 2900 would still preferably indicate that the document was printed, and while block 1700 would still preferably update the user profile in knowledge module 170, printing such a document would preferably not generate any type of credit towards a product subsidy, since such a document would not be considered a "preferred" document, e.g., not a document under the control of edit module 120.

Referring again to FIG. 7, a print schedule of document 13000 is shown. Document 13000 is referred to as a "personalized document". A "personalized document" is a document that is assembled by edit module 120 of document server 100 from a variety of content providers 50 and advertising providers 80, based on information contained in the user profile stored in knowledge module 170. For example, document 13000 is a "personalized document". Our user has requested that document 13000—his personalized newspaper—be printed at 6:00 a.m. every day. Edit module 120 examines the user's interests as specified in the user profile stored in knowledge module 170 to assemble the document from selected content providers 50 in which the user has indicated an interest. Edit module 120 also inserts advertising from selected advertising providers 80—again based on the user profile stored in knowledge module 170.

Figure 8:
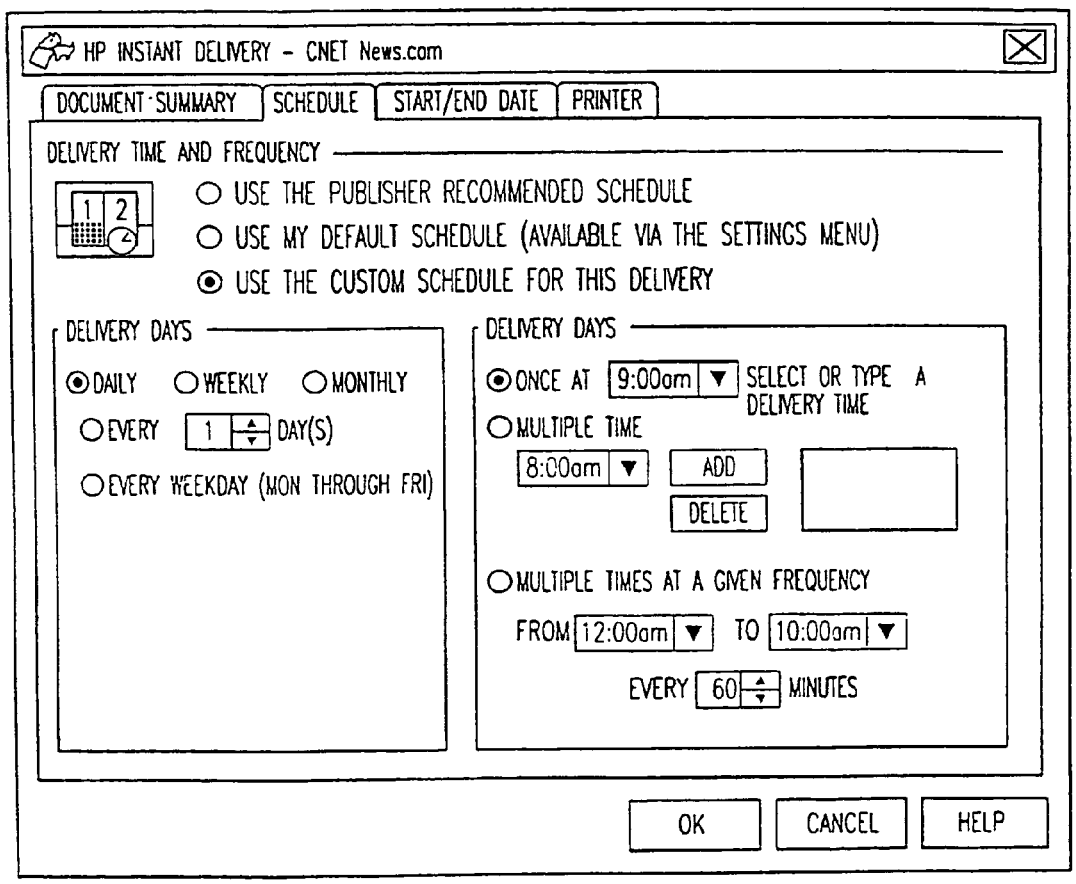
FIG. 8 shows how the print schedule of FIG. 7 can be modified by the user.

FIG. 8 shows how the print schedule 390 of FIG. 7 can be edited by the user. The user can use the publisher's recommended schedule, use a default schedule the user has set, or use a custom schedule for delivery. If a custom schedule is selected, the user can select a daily, weekly, or monthly delivery, or select a delivery once every specified number of days, or specify every weekday. In addition, the time of day can also be specified: once at a designated time, multiple times during the day, or multiple times separated by a specified period of time. While not shown here, the user could also edit print schedule 390 to request that a document be sent upon creation, or upon the occurrence of an external event.

Figure 9A:
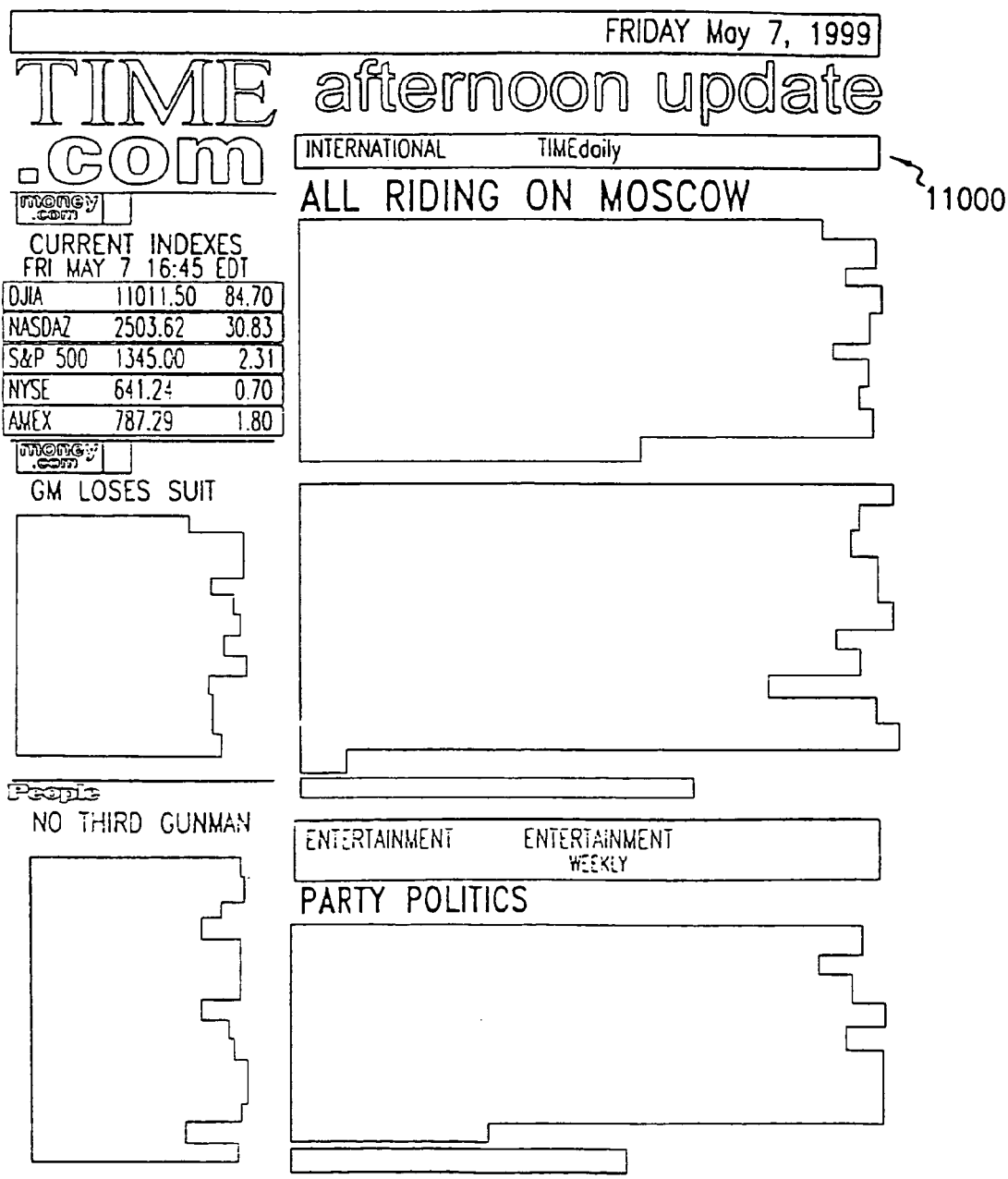
FIGS. 9A–9B shows a document printed by the printing device according to one embodiment of the invention.
Figure 9B:
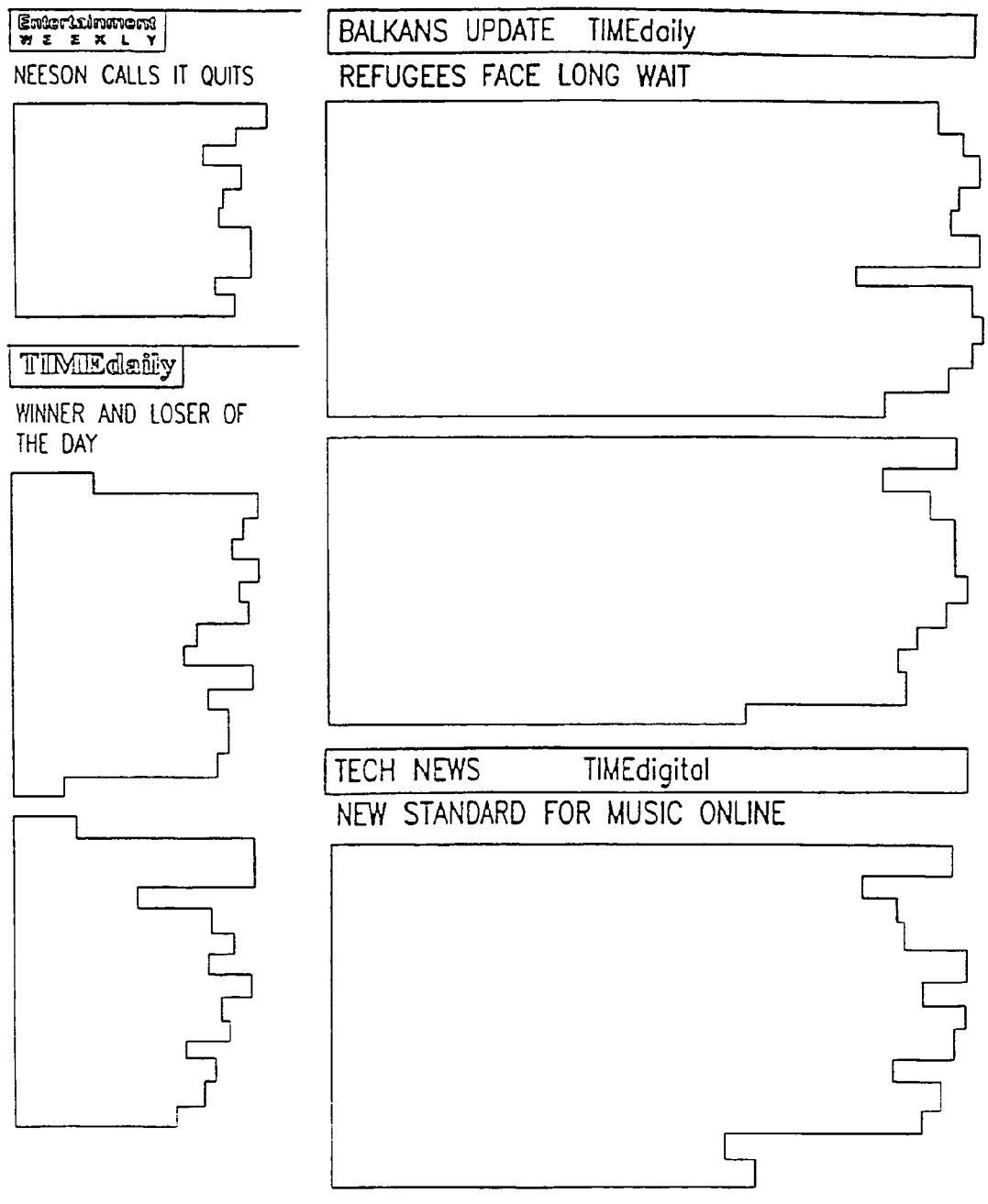
Figure 11A:
FIGS. 11A–11D show a document printed by the printing device according to one embodiment of the invention.
Figure 11B:
Figure 11C:
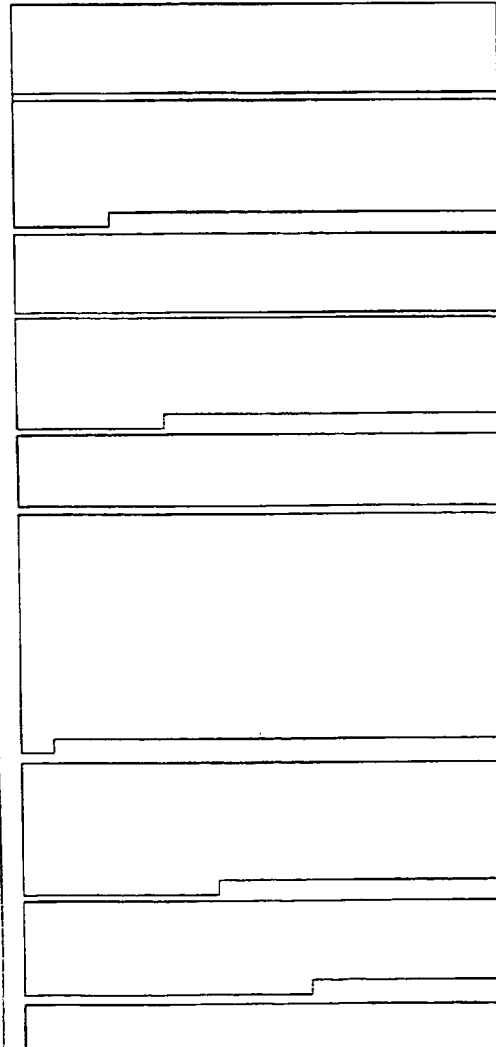
Figure 11D:
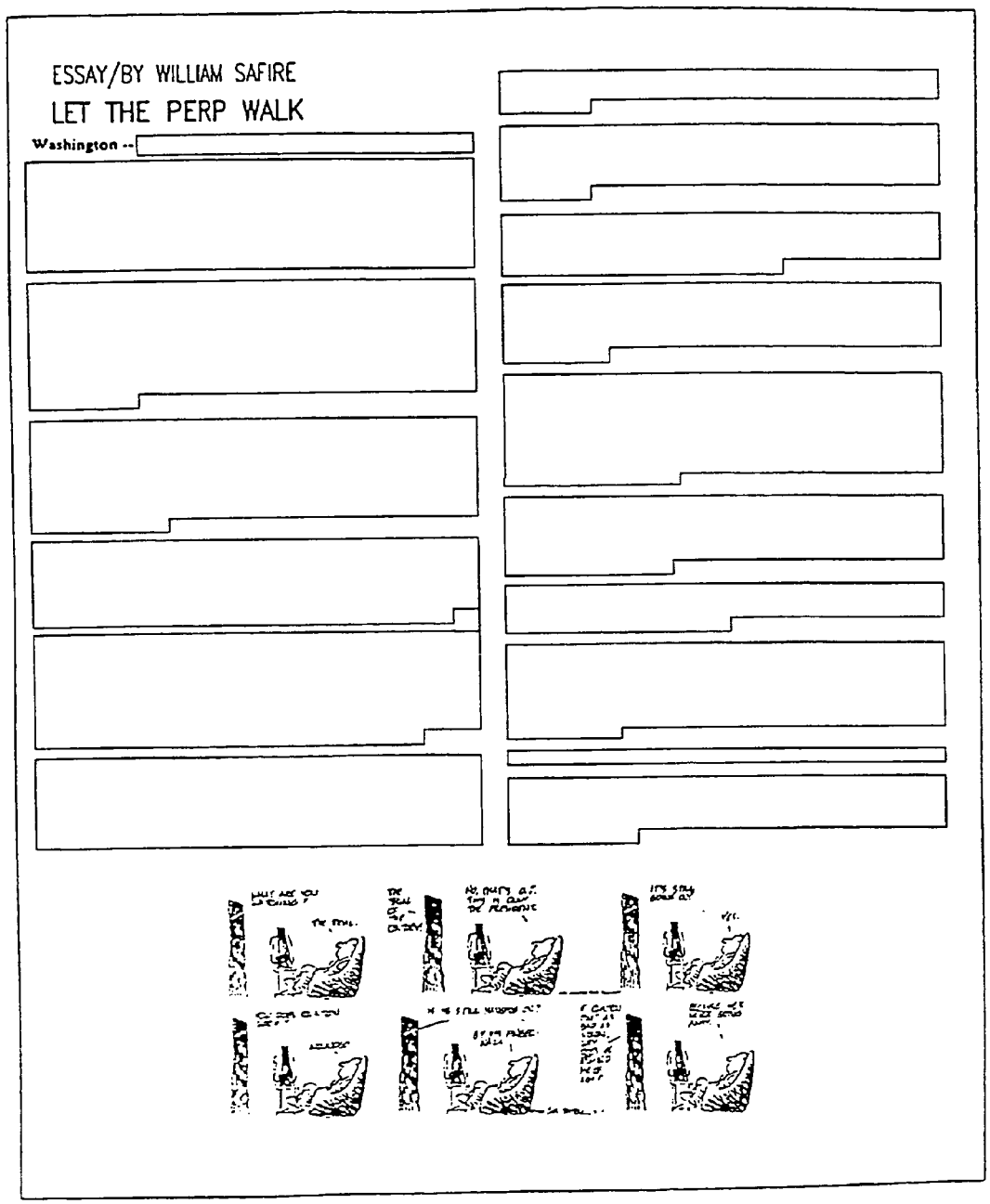

FIGS. 9A–9B show document 11000 printed by the printing device according to one embodiment of the invention. Note that this document came from one content provider 50 via network 200 (either through document server 100 or directly), and contains no advertising. While document 11000 is preferably formatted by content provider 50 such that the information contained in the document is optimized to be printed, such formatting is not necessary.

Figure 10:
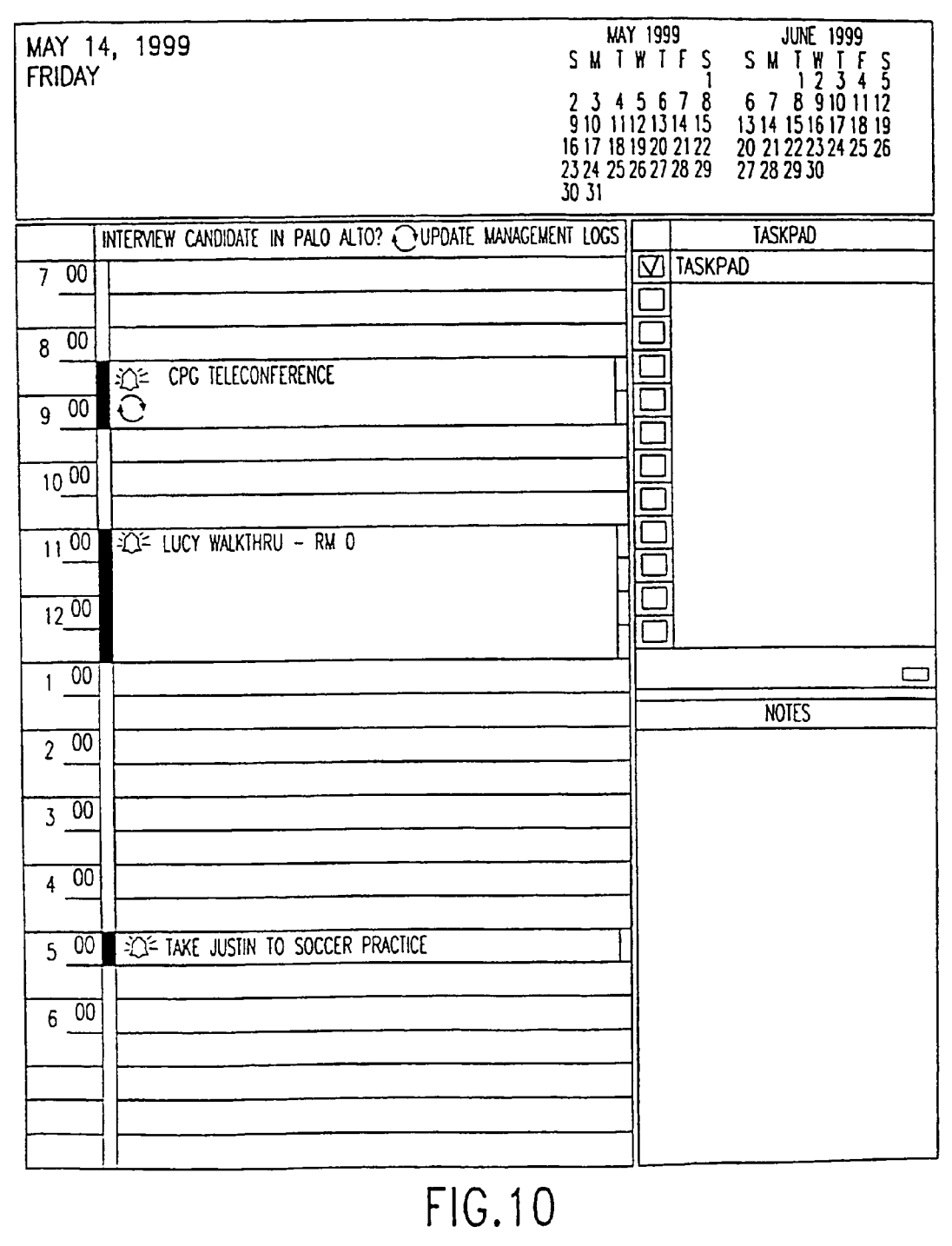

FIG. 10 shows document 12000 printed by the printing device according to one embodiment of the invention. Note that this document is a user's daily calendar which came directly from device 300 and not from document server 100 via network 200.

FIGS. 11A–D show document 1300 printed by the printing device according to one embodiment of the invention. Note that this document is a user's personalized newspaper which contains information in which the user has indicated a specific interest in, as stored in the user profile in knowledge module 170. Note also that this document contains advertising that edit module 120 determined the user would also be interested in, again based on the information contained in the user profile stored in knowledge module 170. As has already been discussed, when the user prints a sufficient number of such "preferred" documents, the user may receive a product subsidy of a print consumable or other product(s).

Figure 12:
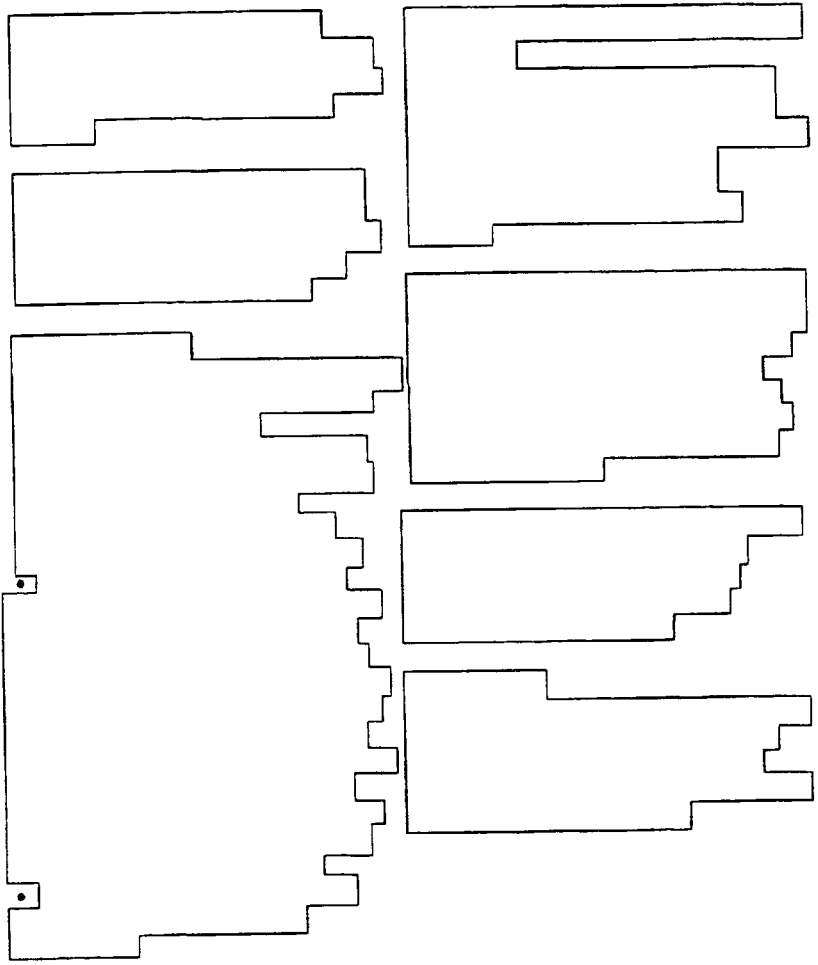
FIG. 12 shows a document printed by the printing device according to one embodiment of the invention.

FIG. 12 shows document 14000 printed by the printing device according to one embodiment of the present invention. Note that document 14000 is the HP Instant Delivery Times—a document located on document server 100. While this document does not contain advertising per se, it is still considered to be a "preferred document", since it is under the control of edit module 120. Document 14000 informs users of Instant Delivery of new releases or new information about the Instant Delivery Program.

Late-Binding Variable Data Publishing Embodiment

As introduced above, an alternate embodiment is envisioned wherein formatting engine(s) 600 issue a publication profile to publication agents 500 distributed throughout delivery system 10 to dynamically compile and format publications for individuals (or communities) utilizing the latest available information from content providers. Just such a system will now be developed more fully with reference to FIGS. 13–23.

Figure 13:
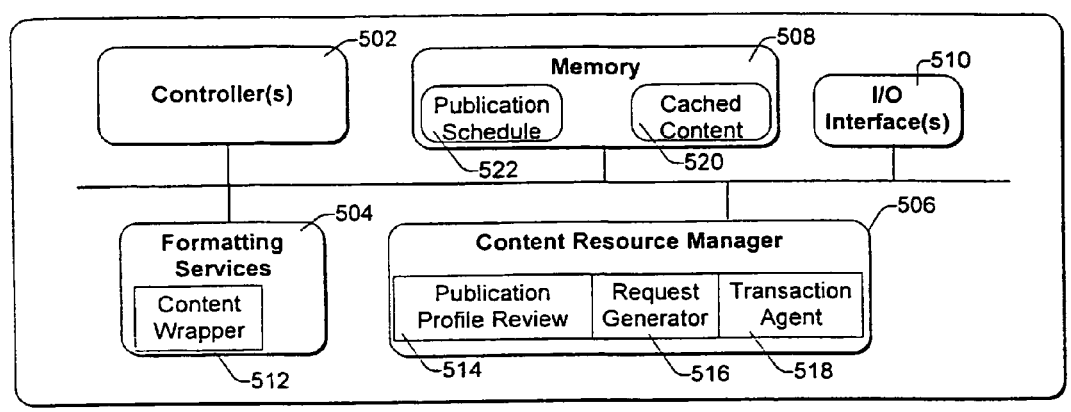
FIG. 13 illustrates a block diagram of an example publication agent according to one aspect of the present invention.

FIG. 13 illustrates a block diagram of an example publication agent, in accordance with one aspect of the present invention. In accordance with the illustrated example embodiment, publication agent 500 is shown comprising one or more controller(s) 502, formatting services 504, a content resource manager 506, memory 508 and input/output (I/O) interfaces 510, coupled as shown. As will be developed more fully below, formatting services 504 include a content wrapper function 512. Content resource manager 506 includes a publication profile review function 514, request generation 516 and a transaction agent 518. Memory 508 maintains a publication schedule 522 generated based, at least in part on received publication profiles, and a content cache 520. It will be appreciated that although depicted as separate and distinct functional entities, one or more functional blocks 502–520 may well be combined into common functional entities. Moreover, although depicted in accordance with a hardware paradigm, those skilled in the art will appreciate that publication agent 500 and its constituent elements 502–520 may well be embodied as a series of executable instructions which, when executed by a host processor, implement the features and functions of publication agent 500 to be discussed below. In this regard, FIG. 13 is merely illustrative of the scope and spirit of the claimed invention.

As shown, controller(s) 502 selectively invoke one or more elements of publication agent 500 to analyze received publication profiles to establish a publication schedule, selectively request content objects from one or more content providers, and provide some initial formatting of the content objects to be provided to the formatting engine 600. Controller(s) 502 receive publication profile(s) from formatting engine(s) 600 via I/O interface(s) 510. In response, controller(s) 502 selectively invoke an instance of content resource manager 506 to review the content of the received publication profile, issue requests for content, and to maintain a log of content distribution. Based on the content of the publication profiles, a publication and request schedule 522 is established in memory 508. But for implementation of the teachings of the present invention, controller(s) 502 are intended to represent any of a broad range of control devices known in the art including, but not limited to, a programmable logic array (PLA), microprocessor, special purpose controller, application specific integrated circuit (ASIC), and the like. In an alternate embodiment, controller(s) 502 are embodied as a series of executable instructions which, when executed, implement the control logic described herein.

Content resource manager 506 is selectively invoked by controller(s) 502 to identify publication information from the publication profile, retrieve content appropriate to the publication and maintain a list of content distribution. In this regard, publication profile review function 514 is selectively invoked by content resource manager 506 upon receipt of a publication profile. According to one implementation, publication profile review function 514 reads the content of the received publication profile to identify one or more of the requested publication time, content preferences and/or formatting preferences. According to one implementation, based on the publication profile, content resource manager 506 updates publication schedule 522 to denote when content requests are to be made, and where the retrieved content should be delivered. In developing the publication and request schedule, content resource manager 506 determines the time-sensitive nature of the content to be retrieved from the select content providers and schedules the request to such providers accordingly. That is, requests to content providers providing content that is unlikely to change over a set period of time (e.g., national advertisements) may be made at any time, preferably as early as possible. In contrast, requests to content providers providing time-sensitive material (e.g., latest stock quotes) are made immediately prior to publication. An example publication schedule 522 is provided with reference to FIG. 18.

Content resource manager 506 selectively invokes an instance of request generator 516 to generate and issue a content request to select ones of a plurality of content providers (50, 80). In accordance with the illustrated example implementation wherein publication agent 500 includes a content cache 522, content resource manager 506 first checks the local cache 522 to identify suitable content to satisfy the content preferences of the publication profile. Before such content is used, however, content resource manager 506 determines if the content object is stale, i.e., whether a newer version of the content exists and, if so, the cached object is discarded. According to the teachings of the present invention, content resource manager 506 issues requests to content providers based, at least in part, on the publication time denoted in the received publication profile. That is, as introduced above, content resource manager 506 schedules requests to each of the content providers based, at least in part, on the type of content requested and the requested publication time.

Transaction agent 518 maintains a record of content distribution. According to one implementation, transaction agent 518 provides a record of content distribution to distribution module 400 and/or a content distribution database.

Formatting service 504 receive content objects sent by content providers (50, 80) in response to content requests issued by content resource manager 506. In accordance with one example implementation, content objects received un-encapsulated by a trace wrapper are sent to content wrapper function 512 for encapsulation. As introduced above, encapsulating the content objects in a trace wrapper enables virtual sensors (not shown) in the document distribution system to accurately track distribution, receipt and disposition of content objects. According to one embodiment, virtual sensors are embedded within printing modules 380 to track distribution, receipt and disposition of encapsulated content objects.

In addition, formatting services 504 cache's received content objects 520 to satisfy subsequent requests for the same/similar content. Once content objects are received, formatting services 504 performs some initial formatting of the received content objects to facilitate integration with the intended publication. According to one example implementation, the formatting performed by formatting services 504 is based, at least in part, on formatting preferences received in the publication profile. Once formatting services 504 has completed at least a partial formatting of the content object, the object is sent to an identified formatting engine 600 for integration within the publication and publishing.

Memory device 508 and I/O interface(s) 510 are each intended to represent such devices commonly known in the art. I/O interface(s) 510, in particular, are intended to include one or more of any of a number of communication interfaces known in the art including, but not limited to, a direct connect communication interface (e.g., a serial interface, a parallel interface, a Universal Serial Bus (USB), an Advanced Graphic Port (AGP), etc.), a local area network interface (e.g., an Ethernet interface, a Token Ring interface, etc.), or a wide area network interface. In this regard, edit module 120 may communicate with any of a number of external and remote devices using an appropriate one of a plurality of wired and/or wireless I/O interfaces 510.

Figure 14:
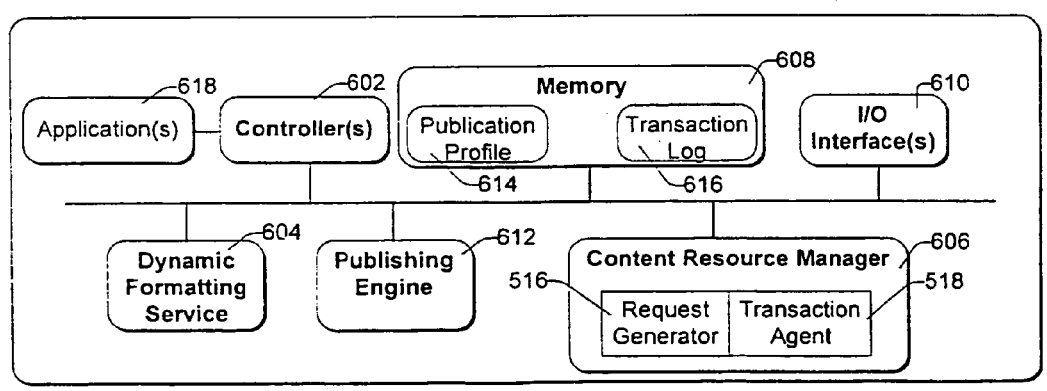
FIG. 14 illustrates a block diagram of an example formatting engine according to one aspect of the present invention.

FIG. 14 illustrates an block diagram of an example formatting engine, according to one aspect of the present invention. In accordance with the illustrated example embodiment of FIG. 14, formatting engine 600 is depicted comprising one or more controller(s) 602, dynamic formatting service 604, content resource manager 606, memory 608, I/O interface(s) 610 and a publishing engine 612, each coupled as depicted. As introduced above, formatting engine 600 initiates publication requests by issuing a publication profile (614) to one or more publication agents 500. In response, publication agents 500 provide formatting engine 600 with one or more content objects deemed suitable for the publication based, at least in part, on the issued publication profile. As will be developed more fully below, formatting engine 600 takes the received content objects and dynamically compiles a publication for a requesting individual/community based, at least in part, on the content and formatting preferences of the publication profile. Although illustrated as separate distinct elements, it should be appreciated that formatting engine 600 and publication agent 500 may well be integrated into a single multi-functional unit. That is, a publishing system element is envisioned comprising both a formatting engine 600 and a publication agent 500 for distribution throughout system 10 to facilitate the publishing services described herein.

As shown, controller(s) 602 selectively invoke one or more resources of formatting engine to dynamically compile and publish a publication reflecting the content and formatting preferences of requesting individuals and/or a community. According to one aspect of the invention, controller(s) 602 selectively invoke an application 620 to generate and/or update a publication profile associated with an individual and/or community. An example publication profile is provided with reference to FIG. 16. According to one implementation, application 620 is a graphical user interface (UI) presented to an individual and/or one or more individuals of a receiving community to denote publication preferences in formatting, content, publication time, etc. An example UI facilitating generation and/or updating of a publication profile is presented below, with reference to FIG. 22. As will be developed more fully below, the publication profile (614) includes information regarding one or more of the publication title, content preferences, formatting preferences, time of publication, location of publication, etc. In accordance with the illustrated example embodiment, publication profile is maintained within formatting engine 600. In alternate implementations, however, publication profile may well be remotely located such as, for example, at knowledge module 170.

In addition to the UI, however, controller(s) 502 receive information regarding the distribution and disposition of content objects comprising publications from one or more virtual sensors 35000 located throughout the delivery system 10. In response to such information, controller(s) 502 update publication profile information to modify one or more of content preferences, formatting preferences, publication preferences, timing preferences, and the like without the need for user intervention.

According to one example implementation, controller(s) 502 issue publication requests minimally including a publication profile (e.g., 614) to one or more publication agents 500. According to one implementation, controller(s) 502 send the requests to known addresses of the publication agents 500 throughout the document delivery system 10. According to one implementation, the publication requests are broadcast to any publication agent 500 via document delivery system 10. In either case, controller(s) 502 periodically issue such requests based, at least in part, on one or more of a predefined publishing schedule, a dynamically generated publishing schedule, publishing schedule preferences denoted in the publication profile, and the like. According to one aspect of the present invention, each of formatting engine 600 and publication agent 500 implement load balancine features to advantageously accommodate the publishing needs of the user's of the document delivery system 10.

Once formatting engine receives content objects in response to a publication request, dynamic formatting service 604 begins integrating the content objects into a dynamically evolving publication format. The publication format utilized by formatting service 604 reflects the nature of the received content and publication formatting preferences denoted in the publication profile. As introduced above, publication agents 500 issue content requests until just prior to publication. In this regard, dynamic formatting service 604 is continuously modifying the content and format of the publication up until the time of publication. According to one element of the present invention, dynamic formatting service 604 also performs editing functions. According to this aspect of the invention, dynamic formatting service 604 must often choose between content objects on the same or similar topic provided by different content providers. Dynamic formatting service 604 selects content on the basis of one or more of content provider agreements, content provider integrity, user preferences in content providers reflected in the publication profile, content object cost, and the like. Once the publication is formatted, it is provided to publishing engine 612 for publication.

As introduced above, one of the innovative aspects of the distributed publication model is the ability to retrieve the latest available information on topics of interest to the receiving individual/community. To facilitate this feature, in accordance with one example implementation, formatting engine 600 may well include a content resource manager 606 including a request generator 514 and/or transaction agent 518. According to one example implementation, formatting engine 600 implements a cut-off period (e.g., 10 minutes) just prior to publication where it will no longer accept content objects from publication agents 500 for use in the publication. At this point, rather than relying on distributed publication agents to retrieve the most time-sensitive material, formatting engine 600 performs this function locally. According to this implementation, content resource manager 606 invokes an instance of request generator 514 to issue content requests to select content providers of extremely time-sensitive material (e.g., stock quotes, local news coverage, local weather conditions, etc.). This information is received directly into dynamic formatting services module 604 for formatting and integration within the publication. As above, this content retrieval is recorded by transaction agent 518 for accounting purposes.

Publishing engine 612 facilitates distribution and publication of the dynamically generated document. According to one embodiment, wherein formatting engine is located within a computing system associated with a receiving individual, publishing engine 612 spools the publication for delivery via a printing device and/or electronic distribution services (e.g., email). In alternate implementations, where formatting engine 600 is remotely located from the destination, publishing engine 612 sends the publication to a destination denoted in the publication profile, e.g., eMail address, network address, Instant Delivery address (e.g., of an instant delivery client), facsimile machine telephone number, and the like. According to one implementation, publishing engine 612 can begin publication of a document while dynamic formatting service 604 is receiving final content objects for integration within the dynamically compiled publication. In this regard, document delivery system 10 facilitates content retrieval of even the most time sensitive material up until the point of publication.

As introduced above, formatting engine 600 maintains publication profile(s) 614 for each of a number of individual and/or community publications. Moreover, memory 608 is also used to maintain a transaction log 616, to record distribution of publications and/or content objects to requesting users. This information is selectively provided to distribution module 400 and/or content provider database for accounting purposes.

FIG. 16 graphically illustrates an example data structure comprising publication profile information, according to one example embodiment of the present invention. According to the illustrated example implementation, publication profile information data structure 614 includes a publication name field 642, a publication_ID field 644, a publication location 646, content interest/preference information field 648, source preference information field 650, an advertising preference field 652 and a publication schedule field 654. As introduced above, some of the information maintained in publication profile data structure 614 is overtly obtained, e.g., by asking the user for such information during a registration period via a UI (e.g., 6000 of FIG. 22). Other information such as, for example, content preference information, is also covertly obtained by monitoring the disposition of trace wrappers by the user, e.g., how much time did the user spend with certain information, did the user forward certain information to others, etc. In this way, the publication profile data structure 614 is a continuously evolving, continuously improving, set of information reflecting the current interests of the users of the document delivery system.

FIG. 17 illustrates an example data structure comprising transaction information (e.g., transaction log 616), according to one embodiment of the present invention. In accordance with the illustrated example embodiment, transaction log data structure 616 includes a content provider name field 622, a content provider ID field 624, a wrapper ID field 626 for each of the content objects provided by the content provider, a rate schedule field 628, a monthly usage field 630 and feedback information field 630. As introduced above, information from the transaction log data structure 616 is periodically provided to one or more of content providers (50, 80) and/or distribution module 400 for accounting purposes (e.g., distribution of bills, royalty payments, product subsidies, and the like).

FIG. 18 graphically illustrates an example data structure comprising publication schedule information, according to an example embodiment of the present invention. As shown, publication profile 700 includes a formatting engine identifier field 702, a publication time field 704, a destination identifier field 706, a content preference field 708, a content provider field 710 and a request time field 712. The formatting engine identifier field 702 denotes the formatting engine associated with the publication request. The publication time field 704 denotes the time of publication by the formatting engine. Based, at least in part, on the time denoted in the publication time field 704 and the time sensitive nature of the requested content, content resource manager 506 establishes a request time, denoted in field 712. The destination ID field denotes where the content object are to be sent. In most instances, it will be the requesting formatting engine. In other instances, however, the destination ID field 706 may be populated with one or more of a telephone number, a network address, an email address, and the like.

As alluded to above, data structures of greater or less complexity may well be utilized to maintain user profile information and/or content provider information without deviating from the spirit and scope of the present invention.

Having introduced the basic operation of document delivery system 10, above, FIGS. 19–23 provide additional operational information regarding select aspects of the present invention.

Accordingly, turning to FIG. 19, a flow chart illustrating an example method for dynamically compiling and generating a publication is presented, in accordance with the teachings of the present invention. As shown, the method begins with block 19002, wherein formatting engine 600 issues a publication request to publication agents 500 of document delivery system As introduced above formatting engine 600 issues publication requests based, at least in part, on publication time(s) denoted in a publication profile 614.

In block 19004, publication agent(s) 500 receive publication request and review the associated publication profile content. More particularly, controller(s) 502 receive the publication request and selectively invoke the features of content resource manager 506 to review the content of the publication profile received in the publication request.

In block 19006, content resource manager 506 first checks to determine whether the requested content is located in an accessible cache (e.g., 520). If the content is not cached, content resource manager 506 identifies potential sources of relevant content and schedules content requests based, at least in part, on the publication schedule and the time-sensitive nature of the content requested, block 19008. In block 19010, publication agent issues the content request(s) to satisfy the publication schedule.

In block 19012, publication agent 500 receives content into a local cache (520), performs some initial formatting on the received content in accordance with the publication profile, and sends the received content to the requesting formatting engine for publication.

In block 19014, formatting engine 600 receives the content from publication agent(s) 500 into dynamic formatting service 604. As introduced above, formatting service 604 performs an editorial function, selecting which of the received content objects will be integrated to form the publication. In accordance with the teachings of the present invention, formatting service 604 formats selected ones of the received content objects based, at least in part, on the formatting preferences denoted in the publication profile as well as the nature of the content.

If, in block 19006, it was determined that relevant content was available in an accessible cache, a further determination is made whether the cached content is stale, block 19015. If so, the process continues with block 19008, as described above. If, however, controller(s) 502 determine that the cached content is not stale, publication agent formats the content per the publication profile and sends the formatted cached content to formatting engine, block 19016, and the process continues with block 19014.

In block 19018, a determination is made whether a publication cutoff time has been reached. If not, the process continues with block 19014, as the formatting engine continues to receive content from publication agent(s) 500. If, however, the cutoff point has been reached, formatting engine selectively issues an additional content request, block 19020. That is, as described above, a content resource manager 606 of formatting engine identifies particular content providers of particularly time sensitive content which satisfies one or more content preferences of the publication profile, and issues a request for content. In block 19022, formatting engine selectively integrates any additional content, as appropriate, into the dynamically formatted publication. In block 19024, formatting engine publishes the dynamically compiled publication for requesting individual(s) and/or community based, at least in part, on the publication schedule denoted in the publication profile.

Figure 20:
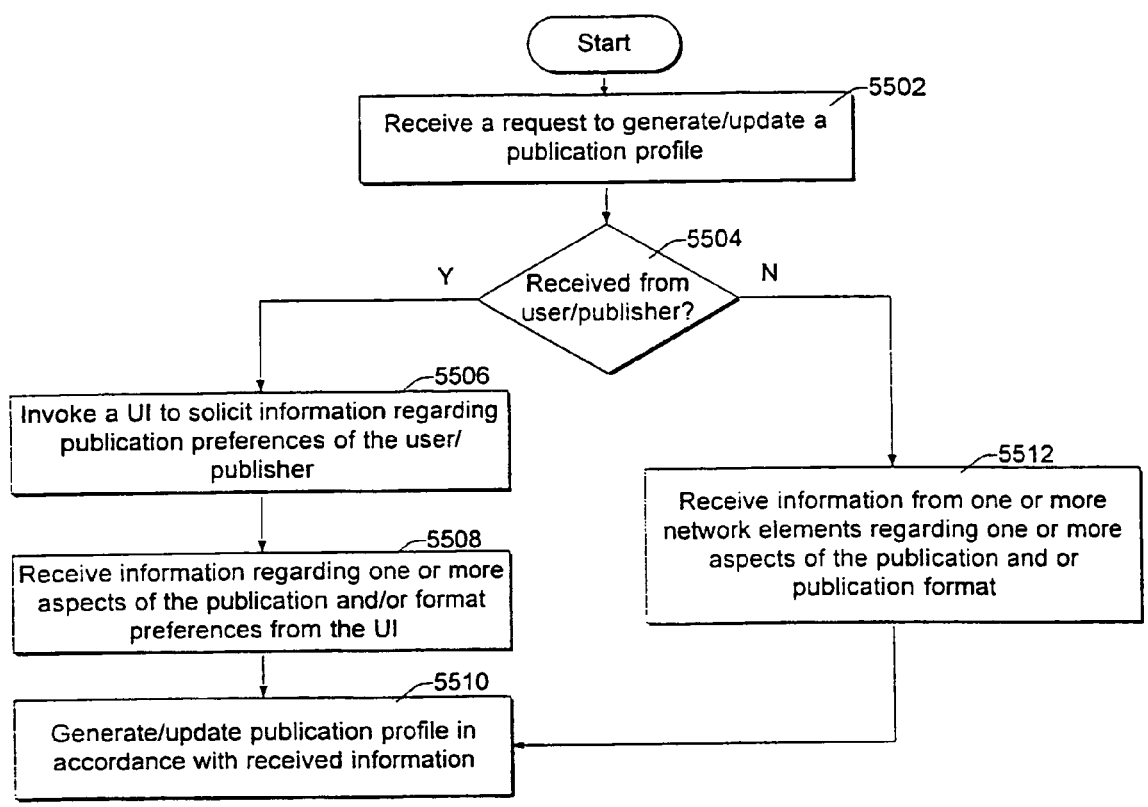
FIG. 20 illustrates a flow chart of an example method for dynamically generating and refining a publication profile, in accordance with one example implementation of the present invention.

Turning to FIG. 20, a flow chart of an example method for generating/updating a publication profile is depicted, in accordance with one aspect of the present invention. In accordance with the illustrated example embodiment of FIG. 20, the method begins in block 5502, wherein controller 602 of formatting engine 600 receives a request to generate and/or update a publication profile. In block 5504, controller(s) 602 determine whether the request was received from an individual/publisher.

If, in block 5504, controller(s) 602 determine that the request to generate/update a publication profile was received from an individual user/community publisher, controller(s) 602 selectively invoke an instance of a user interface application 618 to solicit information regarding the publication preferences of the user/publisher, block 5506. An example of a suitable UI is presented with reference to FIG. 22.

Turning briefly to FIG. 22, an example user interface (UI) suitable for use to generate/update a publication profile is graphically illustrated, according to one embodiment of the present invention. As shown, the UI 6000 requests a producer name and password to register, and also requests information regarding the scope and content of the publication, a publication layout and a publication schedule. This information is received and maintained in a publication profile data structure 640, described above.

Returning to FIG. 20 and, in particular block 5508, controller(s) 602 receive information regarding one or more aspects of the publication and/or publication format from the user/publisher via the UI. In response, controller(s) 602 generate/update an appropriate publication profile 614 in accordance with the received information, block 5510.

If, in block 5504 the request to generate/update a publication profile is not received from an individual user/community publisher, but rather from a network element (e.g., virtual sensor 35000), there is no need to present a UI. Rather, controller(s) 602 receive information from the one or more network elements regarding one or more aspects of the publication content and/or publication format, block 5512. The process continues with block 5510, wherein controller(s) 602 generate/update an appropriate publication profile in accordance with the received information.

Turning next to FIG. 21, a flow chart of an example method for tracking distribution, receipt and disposition of individual content objects comprising a personalized publication is presented, according to one aspect of the present invention. As introduced above, whenever edit module 120 or publication agent 500 receive content (artistic or advertising) it categorizes the content objects and encapsulates the object in a trace wrapper. The trace wrappers are uniquely identifiable markers associated with objects in the document delivery system. Virtual sensors embedded throughout the document delivery system (e.g., in printing modules) identify receipt and interaction with objects encapsulated in such wrappers, covertly providing document delivery system with valuable feedback on which objects are of interest to particular users, the amount of distribution of content objects, and the like.

As used herein, trace wrappers are non-invasive markers, i.e., they do not alter the content of the content objects. For purposes of illustration, and not limitation, an example of a personalized publication 6001 comprised of content objects embedded in trace wrappers 6002(A) . . . (N) is provided with reference to FIG. 23. As shown, content object 6004 is encapsulated within a trace wrapper 6002(A) with a "tag", or "marker" 6006 which is stored in content provider information data structure to uniquely identify the content object.

According to the illustrated example embodiment, the method of FIG. 21 begins with block 5002, wherein a content manager (e.g., within editor module 120) receives a report from one or more virtual sensor(s) that content objects have been sent through, or received by, identified users. In response, content manager issues an update to appropriate publication profiles (5004) as well as the content provider information database (5006) (introduced above) to reflect the distribution, receipt and/or disposition of content objects. In block 5008, editor module 120 periodically initiates financial transactions with content providers 50, advertising providers 80 and subscribing users reflecting the distribution and/or consumption of content objects from the associated providers.

More specifically, edit module 120 initiates royalty payments for the distribution and receipt of content objects provided by select content providers, in accordance with contractual obligations established between the document delivery system and such content providers. In this regard, the contract administrator of edit module 120 identifies the usage of content objects associated with the content providers 50 to determine an accurate royalty payment, and initiates a financial transaction to satisfy the obligation.

According to one aspect of the invention, the degree of accuracy with which content distribution and disposition is monitored within document delivery system 10 facilitates "micro-transactions", i.e., electronic transactions which occur automatically with each system operation in which a financial obligation is created (as defined in contract administration information). According to one example embodiment, a financial account associated with a content provider 50 is credited with a royalty payment each time a content object associated with the content provider 50 is (re)distributed, This may amount to hundreds, thousands or millions of micro-transactions per day, per content provider.

Although described in the context of a royalty payment to a content provider 50, edit module 120 may alternatively debit accounts of advertising providers 80, or subscribing users on a micro-transaction, periodic or other lump-sum basis in much the same fashion as described above.

According to one implementation, the created document is published in a publication catalog, wherein users can browse and select publications of interest for download and/or subscription.

What is claimed is:

1. A system comprising:
    a plurality of content providers coupled to a network;
    one or more publication agents, coupled to the network, to issue one or more requests for content objects from select content providers according to a publication schedule denoted in a publication profile, wherein time-sensitive material is requested immediately prior to scheduled publication and after content objects that are unlikely to change over a set period of time;
    a formatting engine, coupled to the network, to receive content objects from the content providers and dynamically compile the publication; and
    at least one virtual sensor that covertly provides the system with feedback as to the receipt of the content objects and feedback on which of the content objects are of interest to a particular user.

2. A system according to claim 1, wherein the publication profile additionally denotes a time for publication.

3. A system according to claim 1, wherein the publication profile additionally denotes a publication location.

4. A system according to claim 1, wherein the publication profile is associated with a recipient of the publication, denoting a time for publication, where to send the requested content objects, requested publication format(s), and a type(s) of content objects requested.

5. A system according to claim 1, wherein the types of content objects requested include media types including, but not limited to, audio content, video content, graphical content, textual content.

6. A system according to claim 1, wherein the formatting engine is located at a point of publication.

7. A system according to claim 6, wherein the point of publication is a computing system associated with a recipient of the publication.

8. A system according to claim 1, wherein the formatting engine issues the publication profile to the publication agent(s).

9. A system according to claim 8, wherein the formatting engine broadcasts the publication profile on the network, for reception by at least a subset of the publication agents coupled to the network.

10. A system according to claim 8, wherein the publication profile includes an address for the formatting agent.

11. A system according to claim 1, wherein the formatting engine receives content objects from the publication agent(s) up until the point of publication and incorporates the newly received content objects into a dynamically modifiable format of the publication for presentation to the recipient.

12. A system according to claim 11, wherein the formatting engine dynamically modifies the format of the publication to reflect the received content objects and format preferences identified in the publication profile.

13. A system according to claim 1, wherein one or more of the publication agent(s) is also a formatting agent.

14. A system according to claim 1, wherein the formatting agent is also a publication agent.

15. A system according to claim 1, wherein the publication agent(s) cache responses to content objects requests to satisfy subsequent publication profiles requesting similar content objects.

16. A system according to claim 1, wherein the publication agent(s) pre-fetch and cache content objects to selectively place in subsequent publications.

17. A system according to claim 1, wherein the publication agent(s) perform at least an initial formatting of the received content objects in accordance with publication format preferences denoted in the publication profile.

18. In a document delivery system that compiles publications according to a schedule, a method comprising:
    issuing a first and second request for content objects, according to a publication profile, to a plurality of content providers, the first and second requests being based, at least in part, on a time denoted in a publication time field and the time sensitive nature of the requested content objects;
    receiving, from the first content provider, content objects that are unlikely to change over a set period of time;
    receiving, from a content provider providing time-sensitive content objects, the time-sensitive content objects, wherein the time-sensitive material is received immediately prior to scheduled publication and after the content objects that are unlikely to change over a set period of time;

performing an initial formatting of the retrieved content objects based, at least in part, on preferences denoted in the publication profile; and receiving feedback from at least one virtual sensor that covertly provides the document delivery system with feedback as to the receipt of the content objects and feedback on which of the content objects are of interest to particular users.

19. A method according to claim 18, wherein the publication profile includes a time for scheduled publication.

20. A method according to claim 18, wherein the publication profile includes information denoting content objects of interest to a requesting user.

21. A method according to claim 18, further comprising:

sending the retrieved content objects to a formatting engine for integration and publication for the requesting user.

22. A method according to claim 18, further comprising:

integrating the retrieved content objects into a publication; and sending the publication to a requesting user and/or community.

23. A method according to claim 18, further comprising:

caching retrieved content objects to satisfy subsequent publication requests for similar content objects.

* * * * *